United States Patent
Chang et al.

(10) Patent No.: US 7,400,857 B2
(45) Date of Patent: *Jul. 15, 2008

(54) COMMUNICATION SYSTEM USING MULTIPLE LINK TERMINALS

(75) Inventors: Donald C. D. Chang, Thousand Oaks, CA (US); Grant J. Beatson, Torrance, CA (US); Wah L. Lim, Newport Beach, CA (US); Ming U. Chang, Rancho Palos Verdes, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 561 days.

This patent is subject to a terminal disclaimer.

(21) Appl. No.: 09/968,352

(22) Filed: Sep. 28, 2001

(65) Prior Publication Data

US 2002/0081969 A1 Jun. 27, 2002

Related U.S. Application Data

(63) Continuation-in-part of application No. 09/735,860, filed on Dec. 12, 2000, now Pat. No. 6,952,580.

(51) Int. Cl.
H04B 7/185 (2006.01)
(52) U.S. Cl. .................. 455/12.1; 455/13.1; 455/427
(58) Field of Classification Search ............. 455/12.1, 455/429, 13.1, 13.2, 13.3, 427, 428, 430, 455/431, 3.02, 394, 323, 324, 325, 326, 13.5, 455/3.05, 3.06; 342/377, 371, 368; 370/316, 370/466, 535, 469, 401, 474, 12.1, 13.1, 370/319, 320, 321, 322, 310, 315, 394, 323, 370/324, 325, 326; 725/63, 67, 68, 91, 93, 725/100, 114, 134
See application file for complete search history.

(56) References Cited

U.S. PATENT DOCUMENTS

| 2,470,787 | A | 5/1949 | Nosker .................. 342/12 |
| 3,384,891 | A | 5/1968 | Anderson ............... 343/6.5 |
| 3,541,553 | A | 11/1970 | Gubin |
| 3,544,995 | A | 12/1970 | Bottenberg et al. ......... 342/46 |
| 3,720,953 | A | 3/1973 | Alioka .................. 343/771 |
| 4,085,368 | A | 4/1978 | Yeh |
| 4,161,730 | A | 7/1979 | Anderson |
| 4,161,734 | A | 7/1979 | Anderson ............... 343/100 |
| 4,359,733 | A | 11/1982 | O'Neill ................. 343/6.5 |
| 4,613,864 | A | 9/1986 | Hofgen ................. 343/357 |
| 4,635,063 | A | 1/1987 | Chang et al. ............ 342/380 |
| 4,727,503 | A | 2/1988 | McWhirter |

(Continued)

FOREIGN PATENT DOCUMENTS

EP 0335 558 4/1989

(Continued)

OTHER PUBLICATIONS

U.S. Appl. No. 09/655,498, filed Sep. 5, 2000, Chang et al.

(Continued)

*Primary Examiner*—Naghmeh Mehrpour

(57) ABSTRACT

A communication system has a communication infrastructure including at least two devices from the group including a cell tower, a first satellite constellation and a second satellite constellation, a stratospheric platform, that are coupled to user terminals through a plurality of dynamic links. The terminal monitors and changes the multiple and dynamic links as the position of the user terminal relative to the said at least two devices.

20 Claims, 9 Drawing Sheets

U.S. PATENT DOCUMENTS

| | | | |
|---|---|---|---|
| 4,799,065 A | 1/1989 | Thompson | |
| 4,812,788 A | 3/1989 | Wong et al. | |
| 4,819,227 A | 4/1989 | Rosen | 370/75 |
| 4,823,341 A | 4/1989 | Rosen | |
| 4,897,661 A | 1/1990 | Hiraiwa | 342/457 |
| 4,979,170 A | 12/1990 | Gilhousen et al. | 370/104.1 |
| 4,994,809 A | 2/1991 | Yung et al. | 342/108 |
| 5,006,855 A | 4/1991 | Braff | 342/357 |
| 5,017,927 A | 5/1991 | Agrawal et al. | 342/371 |
| 5,077,562 A | 12/1991 | Chang et al. | 342/368 |
| 5,081,464 A | 1/1992 | Renshaw | |
| 5,099,245 A | 3/1992 | Sagey | 342/357 |
| 5,111,209 A | 5/1992 | Toriyama | 342/357 |
| 5,126,748 A | 6/1992 | Ames et al. | 342/353 |
| 5,151,706 A | 9/1992 | Roederer et al. | |
| 5,218,619 A | 6/1993 | Dent | 375/1 |
| 5,233,626 A | 8/1993 | Ames | 375/1 |
| 5,239,668 A * | 8/1993 | Davis | 340/7.27 |
| 5,257,030 A | 10/1993 | Aoki et al. | |
| 5,278,863 A | 1/1994 | Briskman | 375/1 |
| 5,319,673 A | 6/1994 | Briskman | 375/1 |
| 5,327,455 A | 7/1994 | De Gaudenzi et al. | |
| 5,379,320 A | 1/1995 | Fernandes et al. | |
| 5,387,916 A | 2/1995 | Cohn | 342/44 |
| 5,398,034 A * | 3/1995 | Spilker, Jr. | 342/357.02 |
| 5,410,314 A | 4/1995 | Frush et al. | 342/26 |
| 5,444,450 A | 8/1995 | Olds et al. | 342/357 |
| 5,485,485 A | 1/1996 | Briskman et al. | 375/200 |
| 5,525,995 A | 6/1996 | Benner | 342/90 |
| 5,550,809 A | 8/1996 | Bottomley et al. | 370/18 |
| 5,555,257 A | 9/1996 | Dent | 370/95.1 |
| 5,568,484 A | 10/1996 | Margis | |
| 5,572,216 A | 11/1996 | Weinberg et al. | 342/357 |
| 5,589,834 A | 12/1996 | Weinberg | |
| 5,592,471 A | 1/1997 | Briskman | 455/52.3 |
| 5,594,941 A | 1/1997 | Dent | 455/13.4 |
| 5,612,701 A | 3/1997 | Diekelman | 342/354 |
| 5,625,864 A | 4/1997 | Budow et al. | |
| 5,629,707 A * | 5/1997 | Heuvel et al. | 342/357.16 |
| 5,644,572 A | 7/1997 | Olds et al. | 370/324 |
| 5,659,350 A | 8/1997 | Hendricks et al. | |
| 5,682,195 A | 10/1997 | Hendricks et al. | |
| 5,684,799 A | 11/1997 | Bigham et al. | |
| 5,708,963 A | 1/1998 | Mobley et al. | |
| 5,715,516 A | 2/1998 | Howard | |
| 5,717,737 A | 2/1998 | Doviak et al. | 379/58 |
| 5,727,065 A | 3/1998 | Dillon | |
| 5,729,279 A | 3/1998 | Fuller | |
| 5,739,785 A | 4/1998 | Allison et al. | 342/357 |
| 5,740,164 A | 4/1998 | Liron | |
| 5,751,971 A | 5/1998 | Dobbins et al. | |
| 5,754,139 A | 5/1998 | Turcotte et al. | |
| 5,760,741 A | 6/1998 | Huynh et al. | |
| 5,760,819 A | 6/1998 | Sklar et al. | |
| 5,764,187 A | 6/1998 | Rudish et al. | |
| 5,790,070 A | 8/1998 | Natarajan et al. | 342/354 |
| 5,790,541 A | 8/1998 | Patrick et al. | |
| 5,790,546 A | 8/1998 | Dobbins et al. | |
| 5,801,751 A | 9/1998 | Skar et al. | |
| 5,805,067 A * | 9/1998 | Bradley et al. | 340/635 |
| 5,810,284 A | 9/1998 | Hibbs et al. | 244/13 |
| 5,839,053 A | 11/1998 | Bosch et al. | |
| 5,844,636 A | 12/1998 | Joseph et al. | |
| 5,852,721 A | 12/1998 | Dillon et al. | |
| 5,856,804 A | 1/1999 | Turcotte et al. | 342/371 |
| 5,859,874 A | 1/1999 | Wiedeman et al. | |
| 5,862,480 A | 1/1999 | Wild | |
| 5,864,579 A | 1/1999 | Briskman | 375/200 |
| 5,867,109 A | 2/1999 | Wiedeman | |
| 5,878,034 A | 3/1999 | Hershey et al. | |
| 5,903,549 A | 5/1999 | Von der Embse et al. | 370/310 |
| 5,907,816 A | 5/1999 | Newman et al. | |
| 5,909,460 A | 6/1999 | Dent | 375/200 |
| 5,917,447 A | 6/1999 | Wang et al. | 342/383 |
| 5,918,157 A | 6/1999 | Wiedeman et al. | |
| 5,920,284 A | 7/1999 | Victor | |
| 5,944,770 A | 8/1999 | Enge et al. | 701/707 |
| 5,945,948 A | 8/1999 | Buford et al. | 342/457 |
| 5,949,766 A | 9/1999 | Ibanez-Meier et al. | 370/316 |
| 5,956,619 A | 9/1999 | Gallagher et al. | |
| 5,969,674 A | 10/1999 | Von der Embse et al. | 342/357.17 |
| 5,973,647 A | 10/1999 | Barrett et al. | 343/713 |
| 5,974,317 A | 10/1999 | Djuknic et al. | 455/431 |
| 5,982,337 A | 11/1999 | Newman et al. | |
| 5,990,839 A | 11/1999 | Schefte et al. | |
| 5,990,928 A | 11/1999 | Sklar et al. | |
| 5,991,329 A | 11/1999 | Lomp | |
| 5,995,725 A | 11/1999 | Dillon | |
| 5,995,726 A | 11/1999 | Dillon | |
| 6,014,372 A | 1/2000 | Kent et al. | |
| 6,016,124 A | 1/2000 | Lo et al. | |
| 6,016,388 A | 1/2000 | Dillon | |
| 6,016,421 A | 1/2000 | Weiss | |
| 6,018,316 A | 1/2000 | Rudish et al. | |
| 6,020,845 A | 2/2000 | Weinberg et al. | |
| 6,034,634 A | 3/2000 | Karlsson et al. | |
| 6,061,562 A | 5/2000 | Martin et al. | |
| 6,084,864 A * | 7/2000 | Liron | 370/316 |
| 6,084,892 A | 7/2000 | Benash et al. | |
| 6,088,571 A | 7/2000 | Kane et al. | |
| 6,104,911 A | 8/2000 | Diekelman | |
| 6,105,060 A | 8/2000 | Rothblatt | |
| 6,111,542 A | 8/2000 | Day et al. | 342/359 |
| 6,118,824 A | 9/2000 | Smith et al. | |
| 6,138,012 A | 10/2000 | Krutz et al. | 456/427 |
| 6,147,658 A | 11/2000 | Higashi et al. | 343/853 |
| 6,151,308 A | 11/2000 | Ibanez-Meier et al. | 370/316 |
| 6,151,496 A | 11/2000 | Richards et al. | |
| 6,154,501 A | 11/2000 | Friedman | |
| 6,157,621 A | 12/2000 | Brown et al. | |
| 6,161,141 A | 12/2000 | Dillon | |
| 6,173,178 B1 | 1/2001 | Hammill et al. | |
| 6,176,451 B1 | 1/2001 | Drymon | 244/3.14 |
| 6,198,920 B1 | 3/2001 | Doviak et al. | 455/426 |
| 6,201,797 B1 | 3/2001 | Leuca et al. | |
| 6,204,822 B1 | 3/2001 | Cardiasmenos et al. | |
| 6,204,823 B1 | 3/2001 | Spano et al. | 343/766 |
| 6,208,307 B1 | 3/2001 | Frisco et al. | |
| 6,208,858 B1 | 3/2001 | Antonio et al. | |
| 6,215,776 B1 | 4/2001 | Chao | |
| 6,243,412 B1 | 6/2001 | Fukawa | |
| 6,259,415 B1 | 7/2001 | Kumpfbeck et al. | |
| 6,266,329 B1 | 7/2001 | Lazaris-Brunner et al. | |
| 6,266,528 B1 | 7/2001 | Farzaneh | |
| 6,269,244 B1 | 7/2001 | Alperovich et al. | |
| 6,289,389 B1 | 9/2001 | Kikinis | |
| 6,295,440 B2 | 9/2001 | Chang et al. | |
| 6,301,231 B1 | 10/2001 | Hassan et al. | |
| 6,308,045 B1 | 10/2001 | Wright et al. | |
| 6,314,269 B1 | 11/2001 | Hart et al. | |
| 6,317,420 B1 | 11/2001 | Schiff | |
| 6,324,398 B1 | 11/2001 | Lanzerotti et al. | |
| 6,337,911 B1 | 1/2002 | Dillon | |
| 6,337,980 B1 | 1/2002 | Chang et al. | |
| 6,338,131 B1 | 1/2002 | Dillon | |
| 6,339,611 B1 | 1/2002 | Antonio et al. | |
| 6,339,707 B1 | 1/2002 | Wainfan et al. | |
| 6,359,868 B1 | 3/2002 | Chen et al. | |
| 6,366,256 B1 | 4/2002 | Ramanujam et al. | |
| 6,385,434 B1 | 5/2002 | Chuprun et al. | |
| 6,385,647 B1 | 5/2002 | Willis et al. | |
| 6,388,615 B1 | 5/2002 | Chang et al. | |
| 6,388,634 B1 | 5/2002 | Ramanujam et al. | |

| | | | |
|---|---|---|---|
| 6,400,925 B1 | 6/2002 | Tirabassi et al. | |
| 6,408,180 B1 | 6/2002 | McKenna et al. | |
| 6,411,607 B1* | 6/2002 | Robert et al. | 370/316 |
| 6,414,646 B2 | 7/2002 | Luh | |
| 6,424,646 B1 | 7/2002 | Gerszberg et al. | |
| 6,429,823 B1 | 8/2002 | Bains et al. | |
| 6,442,758 B1 | 8/2002 | Jang et al. | |
| 6,445,777 B1 | 9/2002 | Clark | |
| 6,456,846 B2 | 9/2002 | Norin et al. | |
| 6,466,166 B2 | 10/2002 | Nakagawa | |
| 6,473,858 B1 | 10/2002 | Shimomura et al. | |
| 6,484,213 B1 | 11/2002 | Nouri | |
| 6,507,314 B2 | 1/2003 | Chang et al. | |
| 6,510,172 B1 | 1/2003 | Miller | |
| 6,513,758 B1 | 2/2003 | Lloyd | |
| 6,526,580 B2 | 2/2003 | Shimomura et al. | |
| 6,529,706 B1 | 3/2003 | Mitchell | |
| 6,556,845 B1 | 4/2003 | Ide | |
| 6,559,797 B1 | 5/2003 | Chang | |
| 6,560,292 B1 | 5/2003 | Lundby | |
| 6,563,457 B2 | 5/2003 | Chang et al. | |
| 6,574,338 B1 | 6/2003 | Sachdev | |
| 6,628,919 B1* | 9/2003 | Curello et al. | 455/12.1 |
| 6,628,941 B2 | 9/2003 | Knoblach et al. | |
| 6,667,715 B1 | 12/2003 | Chang | |
| 6,674,994 B1* | 1/2004 | Fell et al. | 455/3.06 |
| 6,711,379 B1 | 3/2004 | Owa et al. | |
| 6,741,841 B1 | 5/2004 | Mitchell | |
| 6,751,801 B1 | 6/2004 | Frisco et al. | |
| 6,757,546 B1 | 6/2004 | Hagen et al. | |
| 6,810,413 B1 | 10/2004 | Rajakarunanayake et al. | |
| 6,891,813 B2 | 5/2005 | Feria et al. | |
| 6,909,875 B1 | 6/2005 | Yung et al. | |
| 6,914,557 B2 | 7/2005 | Chang et al. | |
| 6,920,309 B1 | 7/2005 | Yung et al. | |
| 6,963,548 B1 | 11/2005 | Chang et al. | |
| 6,968,394 B1 | 11/2005 | El-Rafie | |
| 6,990,314 B1 | 1/2006 | Hagen et al. | |
| 7,027,769 B1 | 4/2006 | Rosen et al. | |
| 7,068,733 B2 | 6/2006 | Chang et al. | |
| 2001/0003846 A1 | 6/2001 | Rowe et al. | |
| 2001/0004604 A1 | 6/2001 | Toshinitsu | |
| 2002/0050946 A1 | 5/2002 | Chang et al. | |
| 2002/0072332 A1 | 6/2002 | Chang et al. | |
| 2002/0072360 A1* | 6/2002 | Chang et al. | 455/427 |
| 2002/0072361 A1 | 6/2002 | Knoblach et al. | |
| 2002/0072374 A1* | 6/2002 | Chang et al. | 455/452 |
| 2002/0072855 A1* | 6/2002 | Fuchs et al. | 701/213 |
| 2002/0073437 A1 | 6/2002 | Chang et al. | |
| 2002/0118654 A1 | 8/2002 | Chang et al. | |
| 2002/0128044 A1 | 9/2002 | Chang | |
| 2002/0128045 A1 | 9/2002 | Chang et al. | |
| 2002/0132643 A1 | 9/2002 | Chang | |
| 2003/0207684 A1* | 11/2003 | Wesel | 455/427 |

FOREIGN PATENT DOCUMENTS

| | | |
|---|---|---|
| EP | 0682416 | 11/1995 |
| EP | 1 026 778 | 1/2000 |
| EP | 1152552 | 11/2001 |
| GB | 2271 902 A | 10/1993 |
| GB | 2306 827 A | 5/1997 |
| JP | 2-28580 | 1/1990 |
| JP | 3-291584 | 12/1991 |
| JP | 4-27887 | 1/1992 |
| JP | 08015405 A | 1/1996 |
| JP | 07146995 A | 6/1996 |
| JP | 09026328 | 1/1997 |
| JP | 09113600 A | 5/1997 |
| JP | 10090391 A | 4/1998 |
| WO | WO 90/13186 | 11/1990 |
| WO | WO 97/07609 | 2/1997 |
| WO | WO99 13598 A | 3/1999 |
| WO | WO99 23769 A | 5/1999 |
| WO | 2349045 | 10/2000 |
| WO | WO 01/93458 | 12/2001 |
| WO | WO 01/95522 | 12/2001 |

OTHER PUBLICATIONS

U.S. Appl. No. 09/584,012, filed May 30, 2000, Chang.
U.S. Appl. No. 09/550,505, filed Apr. 17, 2000, Chang.
Teles J. et. al, "Overview of TDRSS" Orbit Determination and Analysis, PSD Meeting, Cospar Technical Panel on Satellite Dynamics, 13$^{th}$ Cospar Scientific Assembly, Hamburg, Germany, Jul. 11-21, 1994, Advances in Space Research, pp. 67-76.
Bricker, P. et. al, "Integrated Receiver for NASA Tracking and Data Relay Satellite System", MILCOM 90, A New Era, 1990 IEEE Military Communications Conference, Monterey, CA USA, Sep. 30-Oct. 3, 1990, pp. 1-5.
Dunham, J. B. et. al, "Onboard Orbit Estimation with Tracking and Data Relay Satellite System Data", Journal of Guidance, Control and Dynamics, Jul.-Aug. 1983, USA, col. 6 NR.4, pp. 292-301.
Bethke,K.H., A Novel Noncooperative Near-Range Radar Network For Traffic Guidance and Control on Airport Surfaces, IEEE Transactions on Control Systems Technology, vol. 1, No. 3, Sep. 1993.
Doc 9524 FANS/4-WP/76, International Civil Aviation Organization, Special Committee on Future Air Navigation Systems, Fourth Meeting, Montreal, 2-20, May 1988, Report, pp. 3.2B-2 & 3.2B-3.
Suzuki, R. et. al, :Mobile TDM/TDMA System With Active Array Antenna, Global Telecommunications Conference, 1991; Globecom '91, vol. 3, Dec. 2-5, 1991, pp. 1569-1573.
Chan, K. K., et. al, "A Circularly Polarized Waveguide Array for Leo Satellite Communications", Antennas and Propagation Society, 1999, IEEE International Symposium, vol. 1, Jul. 11-16, 1999, pp. 154-157.
Oodo, M., et. at, "Onboard DBF Antenna for Stratospheric Platform", 2000 IEEE International Conference on Phased Array Systems and Technology, Proceedings, May 21-25, 2000, pp. 125-128.
Yokosuka Research Park, "The First Stratospheric Platform Systems Workshop", May 12-13, 1999, pp. 1-216.
Chiba, Isamu et. al, "Digital Beam Forming (DBF) Antenna System for Mobile Communications", IEEE AES Systems Magazine, Sep. 1997, pp. 31-41.
Miura, Ryu et. al, "A DBF Self-Beam Steering Array Antenna for Mobile Satellite Applications Using Beam-Space Maximal-Ratio Combination", IEEE Trans. On Vehicular Technology, vol. 48, No. 3, May 1999, pp. 665-675.
Sato, Kazuo et al., "Development And Field Experiments of Phased Array Antenna For Land Vehicle Satellite Communications", IEEE Antennas and Propagation Society International Symposium, Jul. 1992, pp. 1073-1076.
Sakakibara, Kunio et. al, "A Two-Beam Slotted Leaky Waveguide Array for Mobile Reception of Dual-Polarization DBS", IEEE Transactions on Vehicular Technology, vol. 48, No. 1, Jan. 1999, pp. 1-7.
Colella N J et al., "The HALO Network™", IEEE Communications Magazine, IEEE Service Center, Piscataway, N.J. U.S., vol. 38, No. 6, Jun. 2000, pp. 142-148, XP 000932657, ISSN: 0163-6804.
U.S. Appl. No. 09/611,753, filed Jul. 2000, Chang et al.
Colella, Nicholas J. et al.; "High Speed Internet Access via Stratospheric Halo Aircraft", INET '99 Proceedings, Internet Society, Technology, Wireless, 13 pages, Jun. 8, 1999.
Casewell, I.E.; "The Provisions of GSM Cellular Radio Environments Within Passenger Aircraft Operating Over Europe"; Racal. Res. Ltd.; Walton-on-Thames; Mobile Radio and Personal Communications; 1989; Fifth International Conference; Dec. 11-14, 1989; pp. 172-176.

* cited by examiner

COMMUNICATION SYSTEM USING MULTIPLE LINK TERMINALS

RELATED APPLICATIONS

The present application is a Continuation-In-Part of U.S. patent application Ser. No. 09/735,860 filed on Dec. 12, 2000, now U.S. Pat. No. 6,952,580 Jun. 21, 2006, which is incorporated by reference herein.

TECHNICAL FIELD

The present invention relates generally to a mobile communication system and, more particularly, to a communication system that uses multiple links for effectively communicating with a mobile user.

BACKGROUND ART

In this communication age, content providers are increasingly investigating ways in which to provide more content to users as well as interfacing with users.

Communication satellites have become commonplace for use in many types of communication services, e.g., data transfer, voice communications, television spot beam coverage, and other data transfer applications. In particular, data transfer may include coupling to the Internet to take advantage of the various resources provided therethrough.

One problem associated with providing mobile communications is maintaining a communications link between the moving mobile terminal and the high altitude device associated therewith. Many types of high altitude devices are used in mobile communication systems including stratospheric platforms, middle earth orbit satellites and low earth orbit satellites. The satellites move relative to the earth and the mobile terminals also move relative to the earth. Prior known systems typically do not provide reliable links particularly in high data intensive applications.

For example, in such systems a single dynamic link may degrade over time due to the relative movement of the mobile terminal relative to the high altitude communication device. As the devices move, the quality of the link drops. Therefore, the total throughput of the system is inhibited.

It would therefore be desirable to provide a reliable mobile communication system capable of handling high data rates and doing so without sacrificing connectivity or data rate.

SUMMARY OF THE INVENTION

It is therefore an object of the invention to provide a mobile communication system that allows high data rate connectivity to the Internet and/or digital television signals.

In one aspect of the invention, a communication system has a communication infrastructure including at least two devices from the group including a cell tower, a first satellite constellation and a second satellite constellation, a stratospheric platform, that are coupled to user terminals through a plurality of dynamic links. The terminal monitors and changes the multiple and dynamic links as the position of the user terminal relative to the said at least two devices. The gateway terminal transmits to and receives from said user terminals through at least two devices from the group.

In a further aspect of the invention, a method for operating a communication system comprises the steps of:

forming a plurality of multiple communication links directed to a communication infrastructure including at least two devices from the group including a cell tower, a first satellite constellation, a second satellite constellation, and a stratospheric platform;

dividing a communication into a plurality of datagrams;

routing the plurality of datagrams through the plurality of multiple communication links;

directing the datagrams from the said at least two devices to a gateway station; and reassembling the datagrams into the communication.

One advantage of the invention is that a stratospheric platform may be used to provide the high altitude communication function. This allows the communication system according to the present invention to be rapidly deployed.

Other objects and features of the present invention will become apparent when viewed in light of the detailed description of the preferred embodiment when taken in conjunction with the attached drawings and appended claims.

BEST MODES FOR CARRYING OUT THE INVENTION

Figure 1:
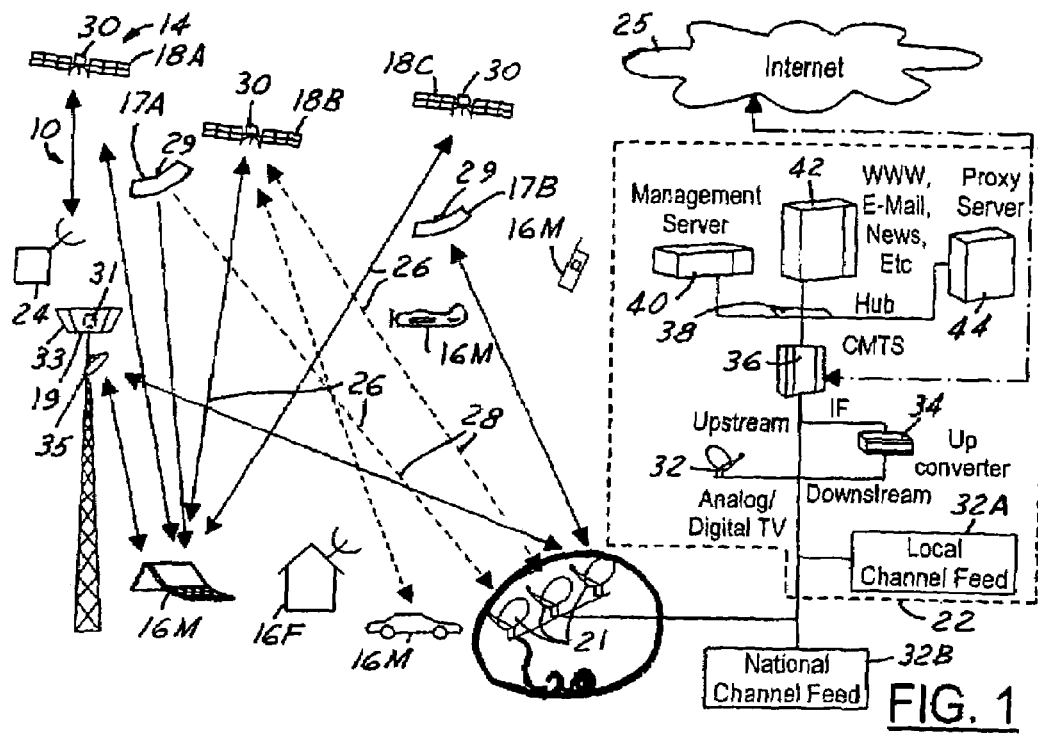
FIG. 1 is a system diagram of a communication system according to the present invention.

In the following description, the same reference numerals are used to identify the same components in the various views. Those skilled in the art will recognize that various other embodiments, structural changes and changes in measures may be made without departing from the scope of the invention. The following description is described with respect to mobile terminals. Although the advantages are suitable in mobile applications, the present invention could be used for fixed terminals. A Referring now to FIG. 1, a communications system 10 is used to couple a plurality of user terminals 16M and 16F with a multiple link communication infrastructure 14. Infrastructure 14 may include a plurality of high altitude communications devices such as stratospheric platforms 17A, 17B and/or satellite constellations having satellites 18A, 18B and 18C, and terrestrial based cell tower 19. Satellites 18A, 18B, 18C may also represent satellites in a respective first constellation, second constellation and third constellation as will be further described below. A plurality of user terminals 16M and 16F are used to illustrate mobile users and fixed users, respectively. Mobile users 16M may comprise but are not limited to automotive applications and other types of transportation systems such airplanes, trains, ships, personal digital assistant applications, portable computers and cellular phone applications. Fixed user terminals 16F may, for example, comprise business-based or consumer-based communication systems. Each user terminal 16F and 16M may receive a signal or signal portions (multiple dynamic links) with a predetermined signal strength from one or a combination of devices 17, 18, 19 forming multiple link infrastructure 14. A spot beam pattern is radiated from each satellite 18 and stratospheric platform 17. Spot beams or radiant broadcasts may be generated from cell tower 19. The present invention is particularly advantageous for use with mobile terminals 16M and distribution of multiple channel television distribution. One attribute of the communication system is that due to advances in electronics set forth herein, each of the devices 17, 18, 19 and beams associated therewith reuse a portion of the bandwidth even though it is used by another beam. This aspect will be further described below.

Communication system 10 further includes a gateway station 20 that is coupled to terrestrial networks 22. Communication system may also include an operations center 24. Both gateway station 20 and operations center 24 are in communication with satellite 18 and platforms 17. Gateway station 20 provides a link between user terminals 16F, 16M and terrestrial networks 22 through infrastructure 14. Operation center 24 provides command and control functions to platforms 17 and satellites 18. Further, operation center 24 may control functions of cell tower 19. Although illustrated as two separate units, gateway station 20 and operation center 24 may be combined into the same physical location.

The communication signals between infrastructure 14 and user terminals 16M and 16F may be referred to as user links 26. User links 26 represent the transmit and receive beams from both types of user terminals 16F, 16M and infrastructure 14. A feeder link 28 is defined between infrastructure 14 and gateway station 20. Each of the user links and feeder links may be multiple dynamic links meaning there are many which are subject to change as the users and infrastructure move in relation to each other. Each link may transmit on as many portions of the communication signals as described below.

Stratospheric platform 17 may be implemented in many forms including an unmanned vehicle that can fly for several months at an altitude of over 60,000 feet above the earth. The stratospheric platform 17 is operated through the operations center 24 to fly in a small radius flight path over a given spot on the earth. As far as users are concerned, the platform is geo-stationary. In addition to a plane-like platform, the stratospheric platform may comprise a balloon or blimp-like platforms.

Satellites 18A, 18B, 18C may be formed from geostationary (GEO), middle earth orbit (MEO) or low earth orbit (LEO) satellites. Practically, it is more likely that the system be implemented in LEO or MEO satellites. Although three satellites are illustrated, many more satellites may be used. Also, satellites from various constellations may also be utilized to transmit one of or many of the multiple dynamic links of the present invention. For example, a satellite constellation such as Iridium® may be used. The figure may also represent three different constellations corresponding to each satellite 18A, 18B and 18C. In the Iridium® satellite constellation, the modulation/demodulation, multiplexing/demultiplexing and channelization schemes are fixed on the satellites. Various multiple dynamic links may be structured so that the sub-segments, data packets or datagrams may go through different channels previously used as voice channels simultaneously at a specified version dictated by the broadcast center. At the mobile terminal, the sub-segment data in a voice channel will be recovered through the same multiplexing, decoding and demodulation scheme used in the Iridium® system. The segment stream will be restructured to properly align time wise for replaying. The number of voice channels of the Iridium® system may be dynamically allocated to accommodate the various bandwidth required. Thus, the multi-link communication infrastructure 14 preferably includes at least two devices from the group including a cell tower, a first satellite constellation, a second satellite constellation and a stratospheric platform.

Another satellite system such as the ICO system which uses a digital "bent pipe" transponder may be used. The digital processing unit of the ICO system is in sub-bands which are about 150 KHz in bandwidth and 6.7 milliseconds in a time window that can support 36 voice channels simultaneously. Sub-bands are the "carriers" to which frequency spots and beam locations may be independently assigned. The overall communication system can process signals into voice channels. The frequency slots and beam positions are assigned independently, not to the voice channel level but to the sub-band level. As a result, partial sub-bands may be used for data transmission when they become available. The sub-bands may be used for mobile television applications and may deliver 2.5 G or 3 G mobile television services in the future.

Globalstar and AMSC mobile systems may also be used in mobile television applications. Analog bent pipe satellites are used in these systems on GEO and LEO orbits. Globalstar uses CDMA multiplexing while the AMSC uses FDMA multiplexing. Each of these systems also uses a different modulation scheme. The mobile television application services may use one or all of the portions of infrastructure 14 for broadcasting the signals of the present invention.

The above-mentioned mobile systems were designed to connect user terminals to voice-based networks. These terminals typically have low gain and broad beam antennas. As a result, the precious L/S band frequency spectrum has been divided for separated mobile satellite operators with one service operator at a given frequency spectrum. This is not the most efficient usage of the spectrum but is the only way to avoid mutual interference among various service providers.

The present invention allows the same frequency spectrum to be assigned to multiple satellites to broadcast different data streams to the same area simultaneously. As a result, the frequency spectrum will be utilized 2.7 times more for the ICO satellite system and about 4 times more for the Iridium® system with respect to voice applications.

The various devices 17, 18, 19 forming infrastructure 14 are used as a communication node for gateway station 20 and user terminals 16F and 16M. Gateway station 20 has antenna or multiple antennas 21 used to communicate with the devices of infrastructure 14. As will be described below, the pointing from mobile terminals 16M may be performed electronically. Although only one gateway station 20 is illustrated in the figure, those skilled in the art will recognize that various numbers of interconnected gateway stations 20 may be employed. High gain antennas 21 have a narrow beam width directed at the desired device. The antenna may need a tracking mechanism with tracking speed adequate enough to maintain a communication link with the various devices of infrastructure 14 throughout the flight path. Gateway station 20 may be coupled to a gateway control circuit 22 which is ultimately connected to the Internet 25, or a corporate intranet.

Each high altitude communication platform 17, 18 has a respective payload 29, 30 that links with user terminals 16M, 16F through the use of a phased array antenna and gateway station 20 with a feeder link antenna (preferably a parabolic dish) described below. In the present example, the payload 29, 30 is used to generate a plurality of user beams configured according to the signal as determined in the gateway station 20. The cell tower 19 also has a control circuit 31 similar to that of payload 29, 30 that links user terminals 16M, 16F and gateway station 20. Cell tower 19 has a phased array antenna 35 to couple control circuit 31 to gateway station 20. Of course, those skilled in the art will recognize third antenna 35 may be replaced with a hard-wired connection.

Gateway control circuit 22 may have various circuitry coupled thereto. For example, analog or digital TV feeds 32 directly at or from a TV broadcasting center, an up converter 34, and a cable modem terminal shelf (CMTS) 36. CMTS 36 may be used to couple to Internet 24. Analog or digital TV feeds may comprise local channel feed 32A and a national channel feed 32B which may be co-located or separated in practice. CMTS 36 may be coupled to a hub 38 that has various resources coupled thereto. The hub 38 may, for example, have a management server 40, a world wide web, e-mail or news server 42 or a proxy server 44.

Figure 2:
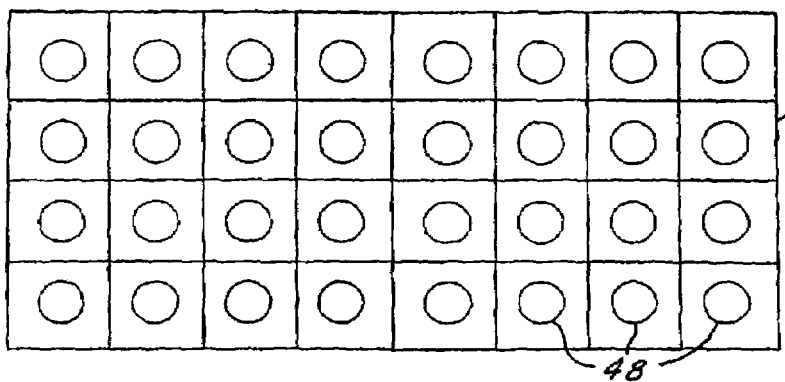
FIG. 2 is a suitable low profile antenna array for use in the present invention suitable for automotive applications.

Referring now to FIG. 2, an antenna 46 for use with an automotive vehicle is illustrated. Antenna 46 is preferably a patch antenna having a plurality of elements 48. The patch antenna is capable of simultaneously generating and receiving multiple links to the various high altitude communication platforms 17, 18 and cell tower 19. Various size and shape antennas are contemplated depending on the specific application. Such an antenna provides the advantages of being low cost, low profile, and high in performance which will encourage adoption in the consumer market. As illustrated in FIG. 2, antenna 46 may, for example, be approximately 30 cm×60 cm with 32 elements 48. Each element may, for example, be 0.3 wavelengths in diameter. Each of the elements may, for example, be placed 0.45 wavelengths apart in the rectangular lattice. Therefore, the total aperture is about 4 wavelengths×2 wavelengths in a square. The expected peak gain in such a system is 18 dB at the boresite, and 15 dB at 60 degrees away from the boresite. The beam widths for the boresite elliptical beam may be approximately 15 degrees and approximately 60 degrees, respectively. The elements are dielectrically loaded and properly matched to have an element beam width of about 150 degrees. Overall aperture efficiency is over 80 percent due to the densely populated elements. It is envisioned that in a consumer application, a motherboard having a number of identical elements may be used. Antenna 46 converts the received microwave power into a digital stream in the receiving direction and converts the digital stream into radiated power in the transmitting direction. The phasing of the elements is implemented by digital multiplication on the motherboard as will be further described below. Performance-wise, a maximum bandwidth for a user signal is assumed to be about 5 MHz. A sampling rate such as approximately 100 Msps with an approximately 4 bit resolution may be used. An aperture time of the analog-to-digital converter may be less than one-eighth of the period of the carrier frequency. At a 2 GHz carrier frequency, for example, an aperture time of 50 picoseconds is adequate.

Such a design is preferably scalable to allow other elements 48 to be plugged into the array. Such flexibility allows higher gain for the antenna 46, if needed.

When forming multiple beams or links, the sampled signals at element level will be "reused" for the second, third and rest of the beams. The array is electrically scanned in two dimensions as described below. As will be further described below, different sets of digital beam formers and frequency and time circuitry are used. Therefore, the incremental cost and processing load of additional beams is low. When first activated, antenna 46 during an acquisition phase all beams will be used simultaneously over the entire field of view of a fan-beam. Thus, the search volume will be reduced to a one-dimensional search in time sequence. If some knowledge is present in the system, only a few beams may be needed to establish the link acquisition.

When a user link is established, the beam or links generated by a user terminal may be electronically tracked to match that of the movement of platforms. Signal strengths from adjacent beams are monitored and compared to the main beam. The beam with the strongest signal will be identified and locked as the main beam. As the platform and/or user moves, the main beam may be switched. The terminal will always choose the beam with the strongest (desired) received signal as the main beam.

Alternatively, the entire receiving antenna and tracking processing can be done through a retrodirective technique via multiple beam-forming through a fast Fourier transform (FFT). The outputs of the two dimensional FFT are associated with signals from various directions covered by the different (contiguous) beams. The history of the beam position will be stored in the terminal as a reference.

Figure 3:
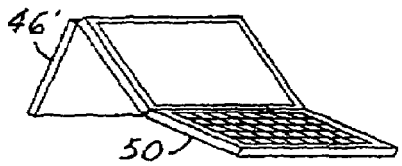
FIG. 3 is a perspective view of a portable personal computer having an antenna array of FIG. 2.

Referring now to FIG. 3, a portable personal computer 50 having an antenna 46 formed according to FIG. 2 is illustrated. Because of the relatively small, thin profile of the antenna 46', incorporation into a portable personal computer is relatively easy.

Figure 4:
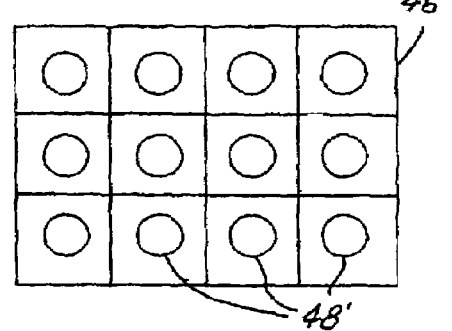
FIG. 4 is a low profile antenna array for use in the personal computer of FIG. 3.

Referring now to FIG. 4, antenna 46' is shown in further detail. Antenna 46' is approximately 12"×18" with 12 elements 48'. Each element may, for example, be 0.3 wavelengths in diameter. Each of the elements may, for example, be placed 0.45 wavelengths apart in the rectangular lattice. Therefore, the total aperture is a square of about 2 wavelengths×1.5 wavelengths. The expected peak gain in such a system is 14 dB at the boresite, and 12 dB at 60 degrees away from the boresite. The beam widths for the boresite elliptical beam may be approximately 30 degrees and approximately 35 degrees, respectively. The elements 48' are dielectrically loaded and properly matched to have an element beam width of about 150 degrees. Overall aperture efficiency is over 80 percent due to the densely populated elements.

Figure 5:
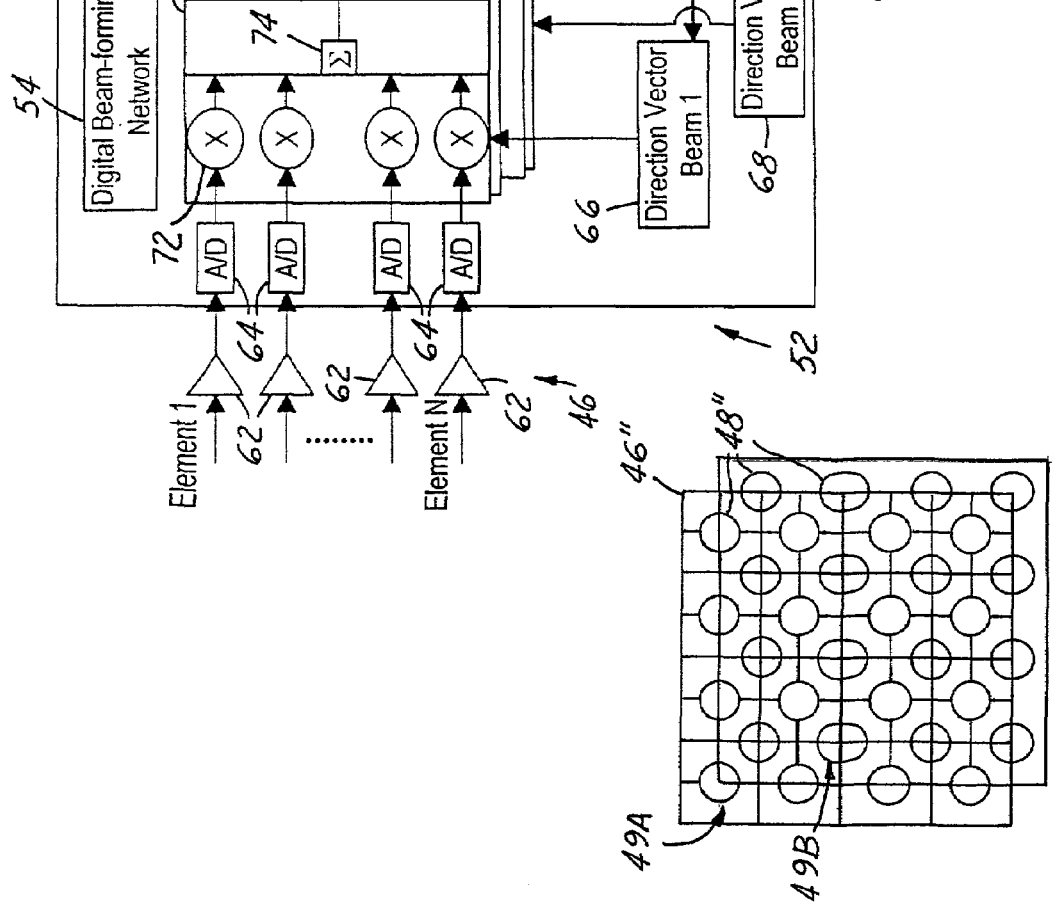
FIG. 5 is an elevational view of a third embodiment of a low profile antenna according to the present invention.

Referring now to FIG. 5, another suitable antenna 46" is shown in further detail. Antenna 46" has two respective groups 49A and 49B of elements 48". Each element 48" may, for example, be 0.3 wavelengths in diameter. Each group 49A and 49B of the elements may for example, be placed 0.7 wavelengths apart in the square lattice illustrated. Various shapes, however, would be evident to those in the art. Therefore, the total aperture is a square of about 3 wavelengths×3 wavelengths. The expected peak gain in such a system is 18 dB at the boresite, and 15 dB at 60 degrees away from the boresite. The beam widths for the boresite elliptical beam may be approximately 20 degrees and approximately 35 degrees, respectively. The elements 48" are dielectrically loaded and properly matched to have an element beam width of about 150 degrees. Overall aperture efficiency is over 80 percent due to the densely populated elements.

Figure 6:
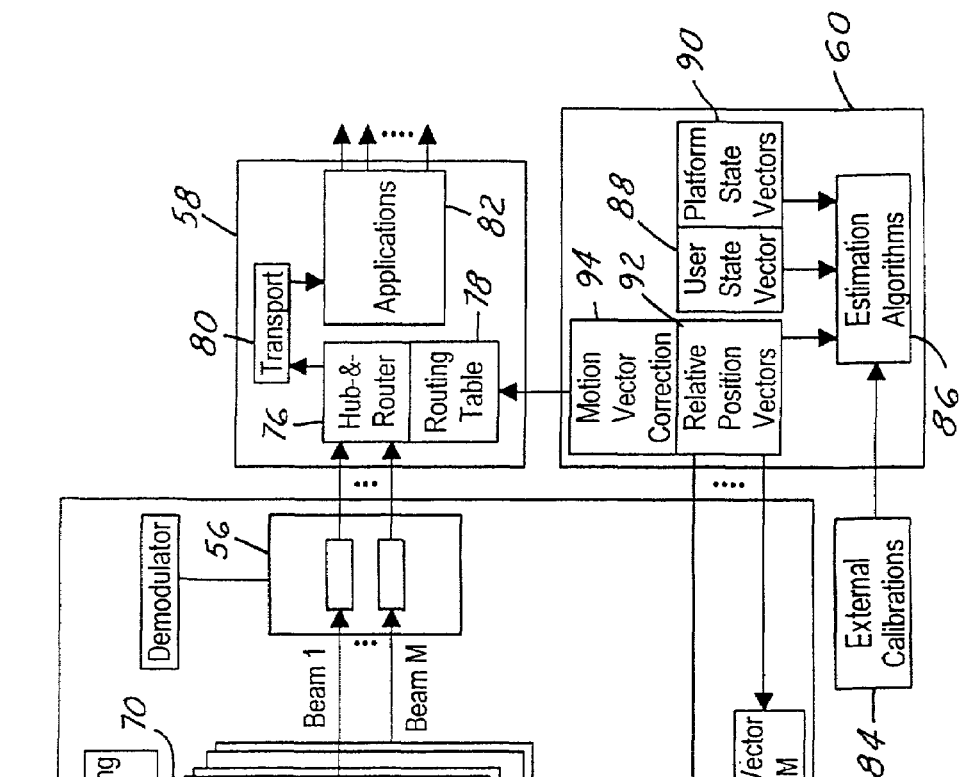
FIG. 6 is a block diagrammatic view of a mobile satellite terminal in receive mode.

Referring now to FIG. 6, a user terminal 52 having antenna 46 coupled to a processing circuit 53 is illustrated in block diagrammatic form. Processing circuit 53 of user terminal 52 generally has a digital beam forming network 54 coupled to a demodulator 56. Demodulator 56 is coupled to a hub and router circuit 58. A direction control circuit 60 is coupled to hub and router circuit 58 and to digital beam forming circuit 54. The general operation of user terminal 52 is that multiple beams are generated at digital beam forming circuit 54. Direction control circuit 60 generally tracks the direction of the movement of the user terminal 52 and the high altitude devices and provides this information to hub and router circuit 58 and the digital beam forming circuit 54. Multiple dynamic link systems may require a separate router and hub as well as a separate demodulator to accommodate the various devices/systems of infrastructure 14.

Digital beam forming circuit 54 has a plurality of elements 62 that correspond to the elements 48 shown in FIGS. 2 and 5. Various groupings of elements 62 are used to generate the simultaneous multiple links of the present invention. Each element 62 is coupled to a corresponding analog-to-digital converter 64 through a band pass filter (BPF) 63. The digital outputs from all analog-to-digital converters 64 are weighted and summed, and then grouped together to form links or beams (beam 1 through beam m as illustrated). The links or beams are formed by numerical multiplications using the direction vector beam 1 illustrated as reference numeral 66 and through direction vector beam m through forming circuit 70. Forming circuit 70 may have a plurality of multiplication blocks 72 and summing blocks 74 implemented either physically or in software to form the various beams. Functions of beam forming, frequency tuning and time synchronization are interlaced to minimize the over-processing mode, instead of sequentially. This approach eliminates conventional phase shifters and minimizes the required RF components making the implementation suitable for consumer applications. Digital beam forming circuit 54 will typically be used to generate multiple simultaneous links with infrastructure 14. It is envisioned that about no more than 10 multiple links would be established at any time.

The links or beams are coupled to a demodulator 56 which demodulates signals and recovers the information in various packages or datagrams. The recovered information is provided to routing circuit 58 which has a hub and router circuit 76 coupled to a routing table 78 which is updated from direction control circuit 60. Hub and router circuit 76 is coupled to a transport circuit 80 which in turn is coupled to an applications circuit 82. As will be further described below, each user link has only a portion of the total signal to be received. These signal portions are referred to as datagrams in the present invention. Hub and router 76 receives various datagrams from the different user links 26 and reassembles them. Various datagrams may be sent through the various portions of infrastructure 14 such as through stratospheric platform 17, satellite 18 and cell tower 19. The various datagrams may not arrive in a sequential order. Thus, hub and router 76 assembles them and may have to shuffle the datagram packets to provide the desired reassembled signal. Once receiving an entire communication segment, transport circuit 80 couples the signal to various applications within the device such as a web browser or other programs. It should be noted that the datagrams must all be reassembled in order to provide a coherent message. If any of the datagrams are lost, the infrastructure 14 will order a retransmit of the missing portion of the datagram. The terminal may start a reassembly timer when it receives an initial fragment. If the timer expires before all the datagrams arrive, the user terminal 52 may discard the surviving pieces without processing the datagram. A request for resending the signal may be initiated.

Direction control circuit 60 is coupled to external calibrations 84 which may be input to the system. External calibrations may include information about the various satellites in the system and the relative positions thereof. Estimation algorithms 86 are coupled to external calibrations 84. Estimation algorithms 86 determine a user state vector 88 and a platform state vector 90. The user state vector 88 and platform state vectors 90 determined the absolute position of each of the high altitude devices and of the user. The user state vector 88 and the platform state vectors 90 are used to generate relative position vectors 92 between user state vector 88 and platform state vectors 90. The relative position vectors 92 are used to generate motion vector correction factor 94 which in turn are provided to routing table 78 in hub and router circuit 58 so the directions of the links (or direction of array beams) can be changed.

Figure 7:
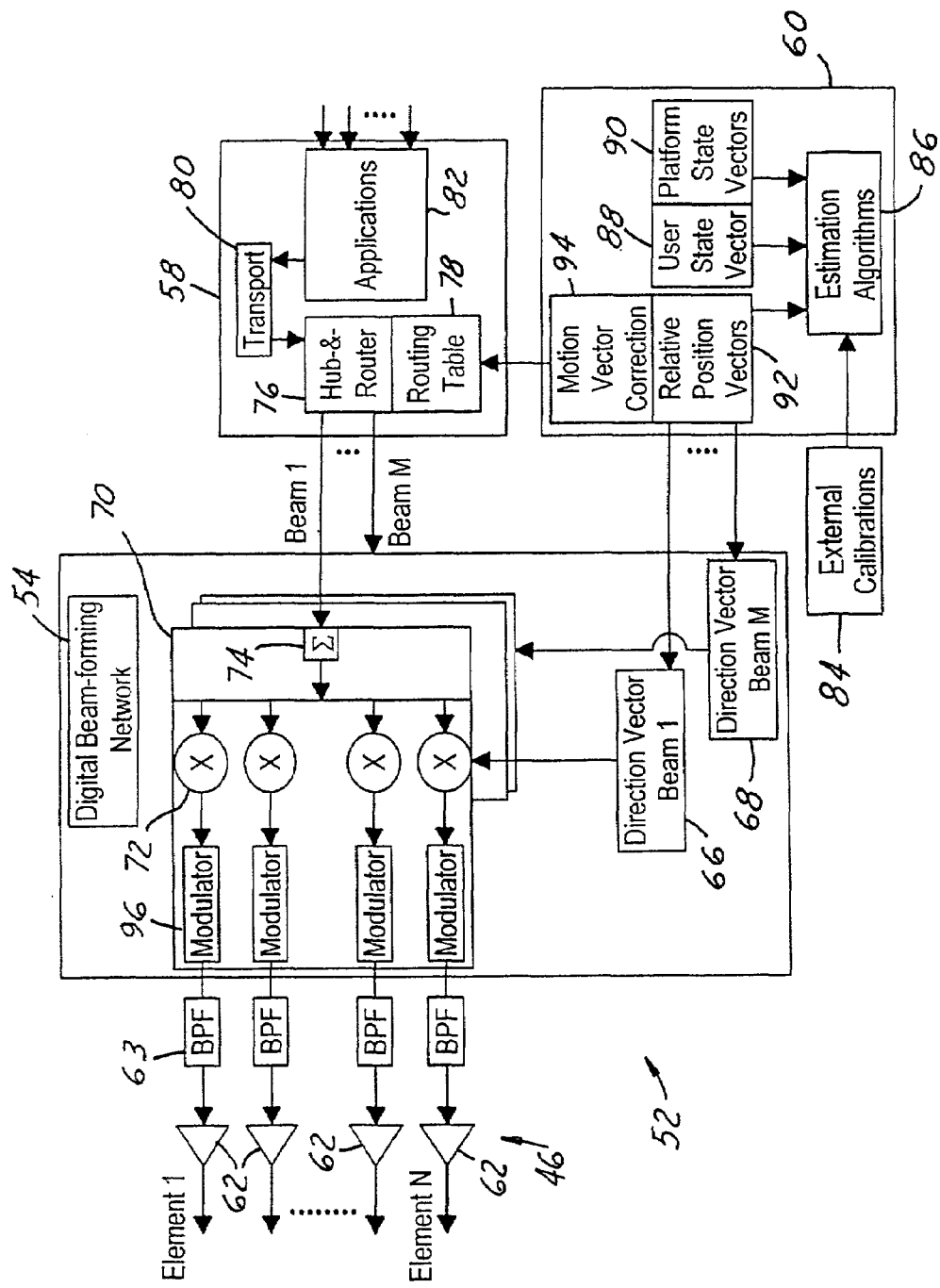
FIG. 7 is a block diagrammatic view of a terminal in transmit mode.

Referring now to FIG. 7, a transmit circuit having a processing circuit 53 similar to that shown in FIG. 6 is illustrated with the same reference numerals illustrated above. It is a generic diagram in which only one modulation is associated with an array beam. It is possible to have multiple links through different beams and different modulation. In the digital beam forming for a given beam, the signal is divided, phase-weighted, and individually modulated before summing circuits for all the elements. The modulation is performed in the microwave carrier frequency by a modulator 96 in every element for each beam. Every element will group all the modulated signals from various beams together before amplification. The amplified element signals are radiated to far field. As a result of the proper phasing in digital beam forming, signals designated for a beam direction radiated from various elements will be coherently summed together in the far field at the particular direction. Similarly, signals for the second beam direction will also be spatially combined coherently in the corresponding directions. The modulations for the first and second beams may not be the same.

Figure 8:
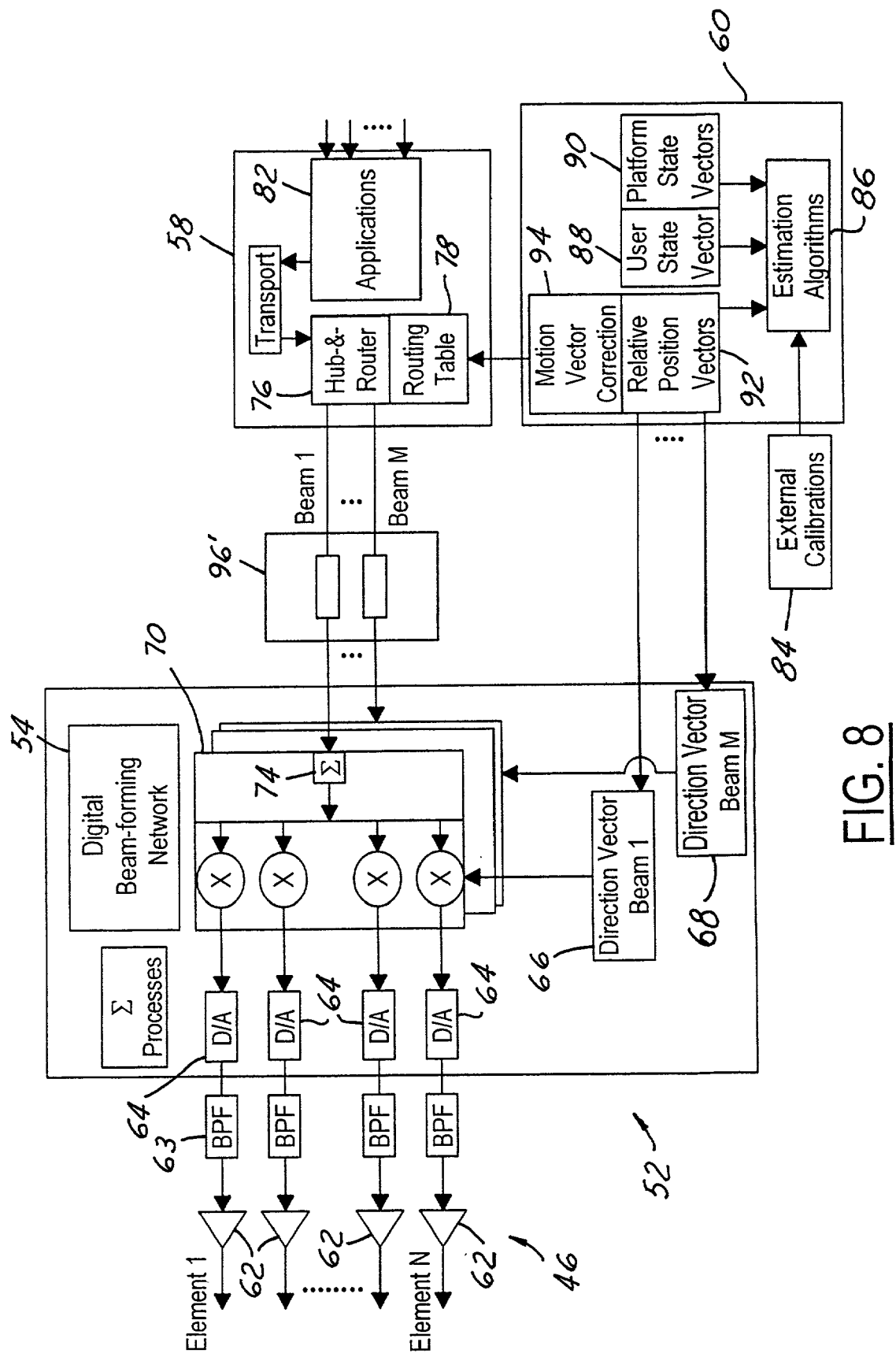
FIG. 8 is an alternative block diagrammatic view of a terminal in transmit mode.

The difference between the transmit architectures in FIG. 7 and FIG. 8 is how the modulation is performed. In FIG. 7, the modulation processing of the processing circuit 53 is performed in RF frequency band while in FIG. 8 the transmit signals are modulated in base-band. In FIG. 8, a circuit similar to that of FIG. 6 is illustrated. In this figure, the modulator 96' has been moved in front of the digital beam forming circuit 54, connecting hub and router circuit 58 and digital beam forming circuit 54. This configuration is believed to be advantageous for a multiple beam configuration.

In operation, the present invention preferably uses TCP/IP protocol. The TCP/IP protocol allows the user terminal to generate both multiple and receiving and transmitting beams to take advantage of the different portions of infrastructures in view to transmit and receive various datagrams, which are portions of complete messages, to and from the gateway terminal. The gateway terminal also receives the datagrams and reassembles them. The present invention takes advantage of the existing TCP/IP protocol and applies it to multi-beam mobile applications. This combination allows mobile terminals to operate in packet-by-packet modes efficiently rather than circuit designated modes, taking advantage of high dynamics from multiple beams and providing various bundled multimedia mobile services to various content providers from TCP/IP protocol.

Figure 9:
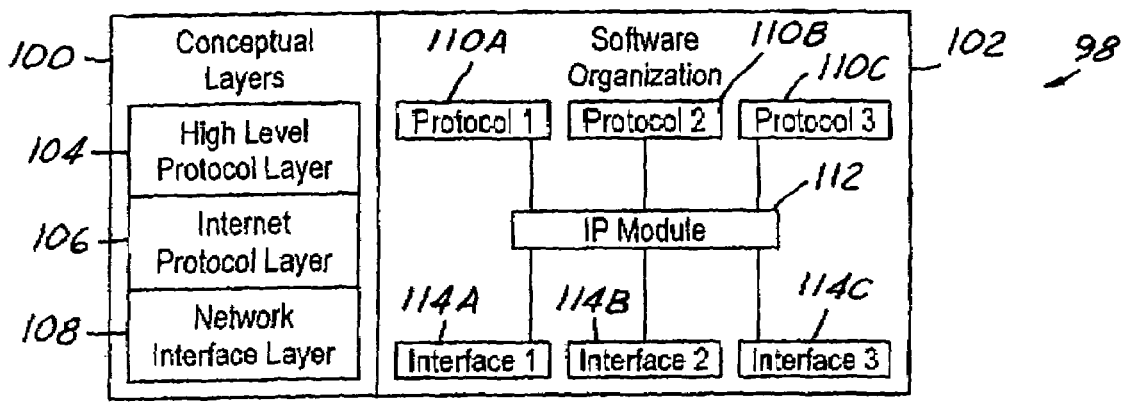
FIG. 9 is an organizational view of a software implementation of the present invention.

Referring now to FIG. 9, the TCP/IP protocol is constructed by layers of modular protocol software. Each layer of the software handles a portion of the problem. For example, one layer of the receive terminal must decide whether to keep the message or forward it to another machine. Another layer must decide which application program should receive the message. Table 98 shows a software organization 102 in various conceptual layers, similar to the Open System Interconnection (OSI) layers. Conceptual layers have a network interface layer 108 (or physical and link layers in the OSI layer structure), an Internet protocol layer 106 (or a network layer), and a high level protocol layer 104. In the high level layer 104 all other OSI layers together are grouped together; from transport, session, presentation and applications. Various protocols 110A, 110B, and 110C are illustrated coupled to an IP module 112. The IP module 112 is coupled to an interface 114A, 114B, and 114C. The protocols correspond to high level protocol layer 104, IP module 112 corresponds to Internet protocol layer 106, and interfaces 114A, B and C correspond to network interface layer 108. Thus as shown, the IP software may communicate with multiple high level protocol modules with multiple network interfaces. From table 98 it is clear that IP protocol is the protocol in the network layer. The IP protocol software must interface with multiple protocols below IP and the IP protocol software must also work with multiple protocols above IP. Preferably, each interface below IP is a wireless link using open communication architecture to set up the terminal software modules cost effectively.

In a receive mode, an aggregated data stream or communication signal intended for a user terminal is grouped into datagrams which are the basic transfer units in the TCP/IP protocol. A datagram is divided into a header and a data area. The IP protocol specifies the header format including the source and destination IP address. The IP protocol does not specify the format of the data area. Arbitrary data may be transmitted in the data area. The length of the datagram is given by the total field length which is specified as 16 bits long. Therefore, the maximum of the datagram is 64 kilobytes.

The TCP/IP software chooses a convenient initial datagram size for the communication and arranges a way to divide large datagrams into smaller pieces when the datagram needs to traverse a network that has a small maximum transfer unit (MTU). The small pieces or communication portions into which a datagram is divided are called fragments, and the process of dividing a datagram is known is fragmentation. Fragmentation usually occurs at a router somewhere along the path between the datagram source and its ultimate destination. The router receives a datagram from a network with a large MTU and must send it over a network for which the MTU is smaller than the datagram size. Once the communication signal has been fragmented, the fragments travel as separate datagrams all the way to the ultimate destination where they are reassembled. In the present case, each of the datagrams may be sent to the infrastructure 14 through multiple links from user terminal 52. The datagrams are then sent through multiple links from the infrastructure 14 to a gateway station where they are reassembled. The datagrams are reassembled before any demultiplexing processes by arranging the fragments received from the various links. If any fragments are lost, the datagram cannot be reassembled. The terminal may start a reassembly timer when it receives an initial fragment. If the timer expires before all the fragments arrive, the user terminal may discard the surviving pieces without processing the datagram. At a high layer of the TCP protocol, a re-send signal may be sent for the entire datagram.

Figure 10A:
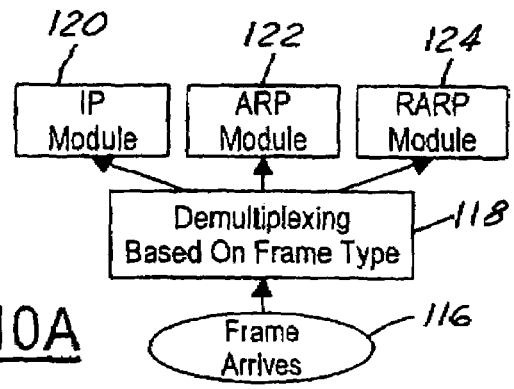
FIGS. 10A, 10B and 10C are flow diagrammatic views for receiving datagrams according to the present invention.
Figure 10B:
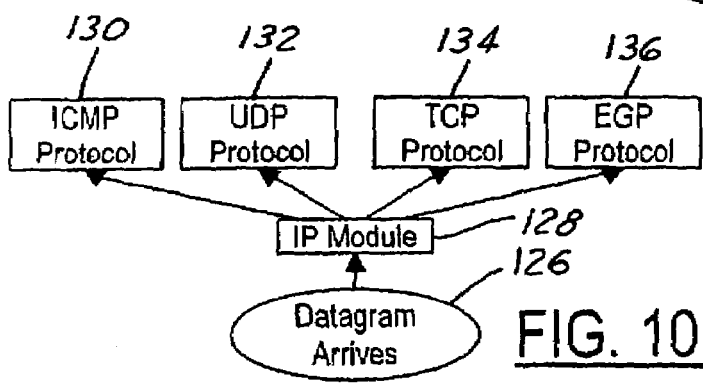
Figure 10C:
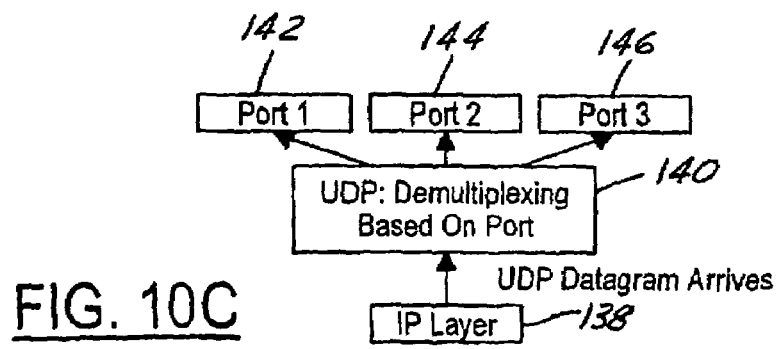

Referring now to FIGS. 10A, 10B, and 10C, three levels of multiplexing are indicated. In FIG. 10A, the first demultiplexing is at incoming frame where frame arrives in block 116. In block 118, the demultiplexing is based upon the frame type. The frame content following the header may be an IP module 120, an address resolution protocol (ARP) module 122, or a reverse address resolution module (RARP) 124. In FIG. 10B, a datagram arrives in block 126, the resident IP software chooses an appropriate receiver to handle the datagram based on the protocol type field in the datagram header in block 128. Datagram may be classified according to various protocols such as Internet control message protocol (ICMP) 130 for router and host to send reports of problems of the datagrams to the originator, including echo requests and replies, User Datagram Protocol (UDP protocol) 132 which is connection oriented, TCP protocol 134 which is connection oriented, and exterior gateway protocol (EGP) 136 for a router in one autonomous system to advertise the IP address of the networks in that autonomous system to a router in another autonomous system.

Referring now to FIG. 10C, the third demultiplexing may take place at a level higher than the IP layer 138. In this example, UDP 140 uses a UDP destination port number to select the appropriate destination port for incoming datagrams. A socket uniquely requests an IP plus a port number. As illustrated, three ports 142, 144, and 146 are illustrated connected to UDP 140. Connection between two hosts is specified fully by sockets assigned to each connection end. Connections between two sockets are full dual duplex communication paths between end processes. TCP uses connection, not protocol port as its fundamental abstraction; connections identified by a pair of end points. TCP provides reliable stream service, UDP provides unreliable datagram service; application programs use both.

Figure 11:
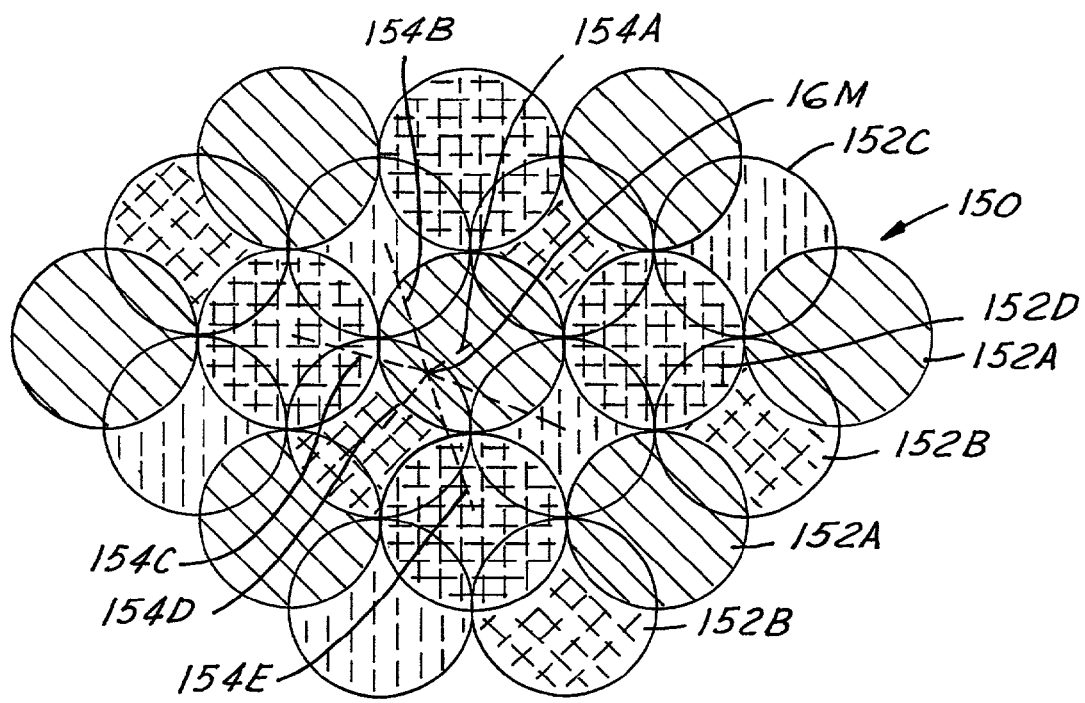
FIG. 11 is a plan view of a multiple link system according to the present invention having 4 used frequencies.

Referring now to FIG. 11, one embodiment of the invention may be used with four-color reuse for a service area 150. Service area 150 has a plurality of beam footprints 152A, 152B, 152C, and 152D. Footprints 152A–152D correspond generally to the footprint of a base station for a radiated beam from a platform. If, for example, base station is a cell tower, the cell tower is located at the center of each of the footprints 152. In conventional systems, each base station uses one portion of the allocated frequency to broadcast communication signals to user 16M so that interference will exist. In the present invention, each base station or footprint represents the entire allocated frequency. More specifically, each base station may be capable of broadcasting the entire frequency. That is, instead of operating on 25 percent of the spectrum, all base stations have full spectrum to operate. The isolations among cells are achieved, in addition to power controls, by spatial discrimination capability on both user terminal antennas and directional antennas on the base stations. As illustrated, user 16M has five links 154A–154E established, and yet the user terminal has accessible bandwidth about five times the total allocated spectrum. This result is accomplished because user 16M may receive signals from adjacent base stations.

Figure 12:
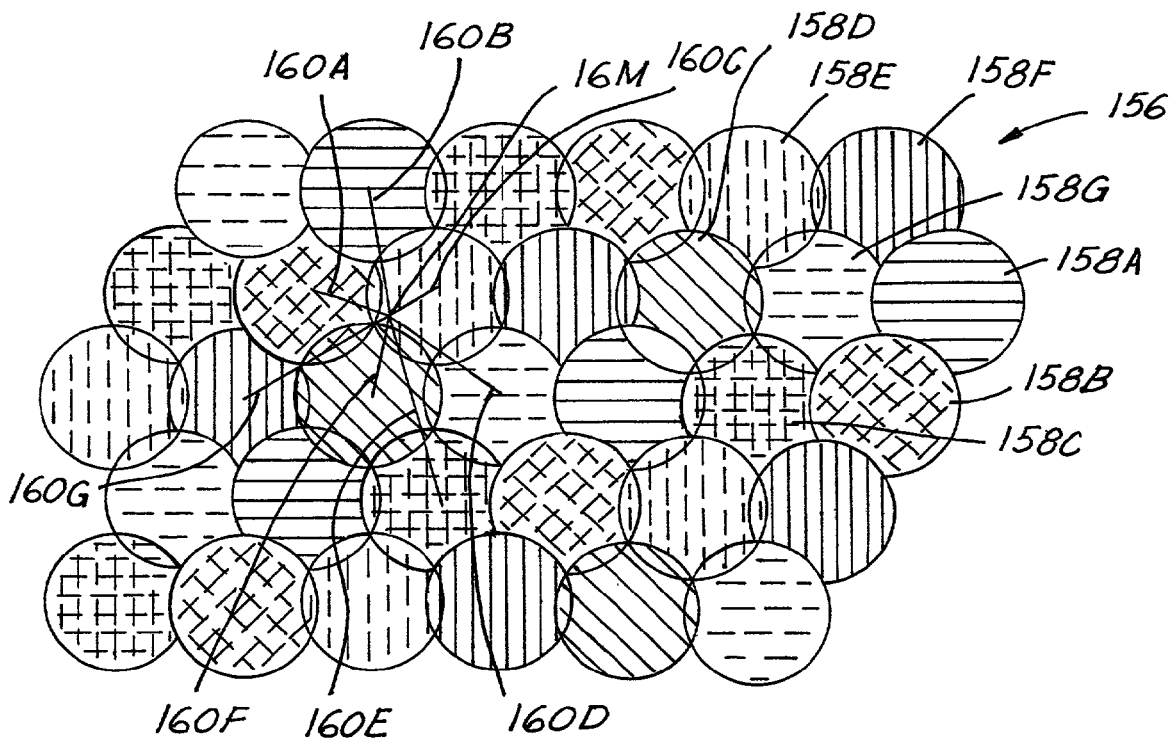
FIG. 12 is a plan view of a service area having 7 simultaneously used frequencies.

Referring now to FIG. 12, a seven-color reuse service area 156 is illustrated with a user 16M located in one of the footprints. In this embodiment, seven different color footprints 158A–158G are illustrated. In this embodiment, seven links are illustrated which allows users potentially to have access up to 3.5 times the total allocated spectrum.

User terminals used in FIGS. 11 and 12 may be one of the antenna arrays illustrated in FIGS. 2, 4 and 5.

In operation of the system, the base stations generate communication signals using the allocated bandwidth. Some of the communications signals may use the same frequency even for the same user. The user terminal 16M establishes a plurality of multiple dynamic links that correspond respectively to the plurality of base stations. The user terminal 16M generates multiple communication portions such as the datagrams mentioned above and transmits the multiple communication portions through the multiple dynamic links to at least two of the plurality of base stations. The user terminal receives the communication portions from the base station and reassembles the communication portions into the communication signal. As mentioned above, the base stations may include a stratospheric platform, LEO, MEO or GEO satellites or cellular towers. Each of the plurality of established dynamic links are capable of having independently varying data rates. The communications may be initiated at the user terminal or a gateway station. In either case, the communication signal is divided into a plurality of datagrams and transmitted to a base station. Each datagram may be routed through a different base station. The datagrams are then transmitted to the gateway station if originating in a user terminal through dynamic links established at the base station. If the communication signal originated at a gateway station, multiple dynamic links are established at the base station for communication of the datagrams through various base stations to the user terminal. By way of example, the gateway station may communicate a communication signal via a first datagram and a second datagram to a first base station and a second base station. The first base station and the second base station may communicate the first datagram and the second datagram respectively to a user terminal. In turn, a user terminal may generate a second communication signal destined for the gateway station. The second communication signal may comprise a third datagram and a fourth datagram and be communicated to the base station through a third dynamic link and a fourth dynamic link respectively. The first base station and the fourth base station establish a respective fifth and sixth dynamic link whereby the third and fourth datagrams are communicated to the gateway station.

Various types of signals may be communicated to and from the gateway station. For example, television and Internet signals may be communicated from the base station and other communication signals may be communicated from the user terminal such as information requests and e-mails.

Figure 13:
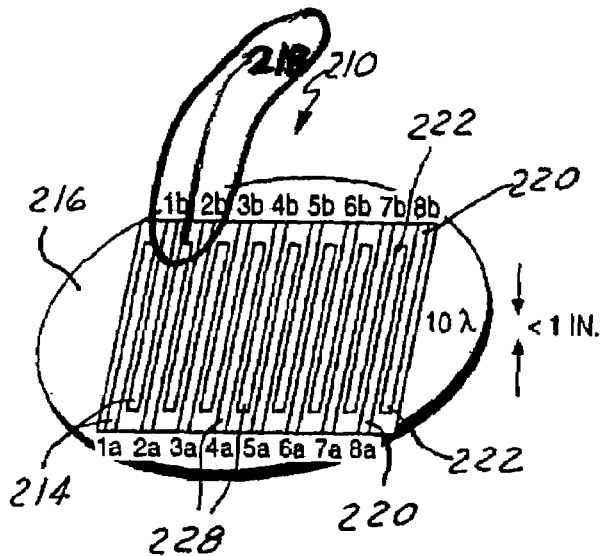
FIG. 13 is a perspective view of a rotating antenna configuration utilizing slotted waveguides.

Referring now to FIG. 13, an alternative type of antenna is illustrated. In this embodiment, the antenna 210 is particularly suitable for use in transmitting and receiving direct television programming. The antenna 210 is also suitable for establishing multiple dynamic linkages with a base station. More particularly, the embodiment illustrated in FIG. 13 is particularly suitable for communications with a satellite-based broadcasting source. In typical satellite television broadcasting systems the television programs are delivered through dedicated individual channels. However, the present invention allows the programs to be packetized and delivered through various routes. For example, the present invention is suitable for allowing national television feeds to be broadcast from satellites while local programming may be broadcast from another type of base station such as a stratospheric platform.

The preferred antenna 210 is illustrated in FIGS. 13 through 17 and provides a low cost and low profile configuration that also provides high performance. It should be understood that the illustrated antenna configuration is merely one preferred embodiment for achieving the objects of the present invention and that other configurations that provide low cost, low profile, and high performance may be utilized.

As shown in FIG. 13, the antenna 210 includes a plurality of antenna radiation elements 214 that are positioned on a circular plate 216. The circular plate 216 is a rotating plate that rotates about a center axis, as will be described further herein.

In a preferred embodiment, the rotating plate 216 is less than one inch (1") thick and has a diameter of fifteen inches (15") or less. Obviously, the dimensions of the rotating plate 216 may vary. However, the greater the diameter and thickness, the larger and more costly the antenna 210 will become. As shown in FIG. 13, the antenna radiation elements 214 are preferably constructed using a plurality of parallel slotted waveguides 218. However, a variety of different antenna radiation elements may instead be utilized, such as patch arrays. The operation of the disclosed antenna configuration is described in a receive mode only. The corresponding transmission mode operation can be easily understood by one of skill in the art via reciprocity.

Each slotted waveguide element 218 is approximately 10 wavelengths long. In one embodiment, 16 long waveguide elements 218 are positioned on the circular plate 216. The waveguide elements 218 are grouped into two groups and are interlaced, as shown in FIG. 1, such that waveguide 1a and waveguide 1b begin at opposite ends of the circular plate 16 and overlap one another. Each of the individual waveguides are preferably separated by one-half wavelength (½λ). Therefore, the total aperture in which the waveguide elements are positioned is about 10×10 wavelength in a square and the expected peak gain of a straight out or boresight beam from this aperture is about 28 to 30 dB. While the circular plate 216 rotates, rotating the antenna radiation elements 214 therewith, the vertical position of the circular plate 216 remains generally stationary. It should be understood that the number of waveguides positioned on the circular plate may vary, however, the preferred number of waveguide elements is between 10 and 20. Further, the distance between the waveguide elements and their length may also vary.

In a receive mode, the array antenna 210 will be rotated in the azimuth such that all slot array elements 218 will be in alignment with the planar wavefront of an intended incoming signal. Consequently, all the slots in a long waveguide element 218 are excited by the same planar wavefront simultaneously.

Each slotted waveguide element 218 has a first end 220 and a second end 222. The first ends 220 are positioned on a surface of the aperture 224 defining the radiation elements, while the second ends 222 are overlapped by adjacent slotted waveguide elements 218 such that the elements are interdigitally spaced. Each waveguide element 218 has a plurality of cross-slot openings 226 formed on their top surfaces 228. An H-plane septum (a metal plate) 230 is inserted into each waveguide element 218. Each metal plate 230 has a plurality of slanted slots 232 formed therethrough which act as one of the key circular polarization exciting mechanisms.

The waveguide elements 218 operate in a standing wave mode and have an identical fan-beam pattern with a 6° by 150° elliptical beam created through the cross-slot openings 226 on the top surfaces 228 of the waveguides 218. The cross-slotted waveguides 218 and the septum plate 230 are both illustrated in FIG. 14. The slanted slots 232 on the septum plate 230 are angled at approximately 45° and when positioned inside each waveguide element 218 will interact with the matching perpendicular cross-slots 226 on the top surface 228 (or E-plane) of the respective waveguide element 218. As a result, an incoming (right-hand) circular polarized wave on the E-plane wall will excite an $TE_{01}$ mode wave inside each waveguide element 218. To receive the opposite (left-hand) polarized wave, the slant angle of the slanted slots 232 on the septum 230 must change to approximately 135° or 45° in the opposite direction. On a given plate 216 some of the longitudinal elements 218 will have septums 230 with slanted slots 232 at approximately 45° and some of elements 218 will have septums 230 with slanted slots 232 at approximately 135°. It should be understood that a variety of other types of waveguide elements may be utilized so long as they allow for the formation of multiple beams.

In operation, the circular plate 216 will be rotated to a position such that the wave front of an intended incoming wave is parallel to the central axes of these slotted waveguide 218. The fan beam radiation pattern of each slotted waveguide element 218 will intercept the incoming wave individually, which will then be amplified, filtered, coded, multiplexed, and down converted. As shown in schematic FIG. 15, the conditioned signals will be converted to digital streams, which will then be decoded, digital beamformed, and then transferred to a digital receiver. A digital receiver will then convert the received waveform into information signals.

Figure 14:
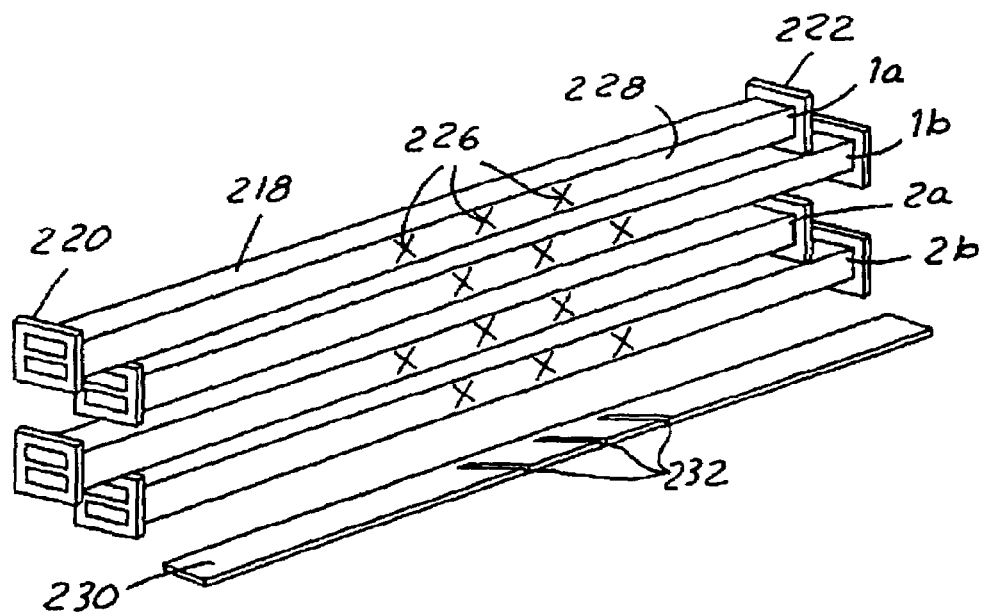
FIG. 14 is a perspective view of a plurality of cross-slotted waveguides for use on an antenna surface.
Figure 15:
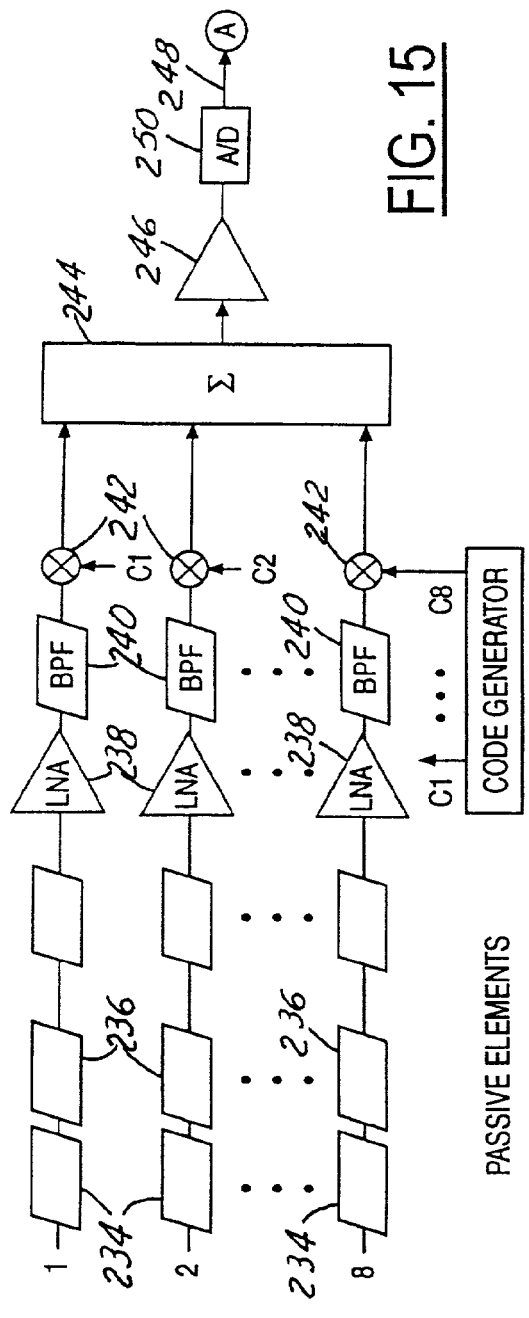
FIG. 15 is a schematic diagram of a circuit for intercepting the incoming wave and converting the wave signals to digital streams.

Specifically, as shown in FIG. 14, each of the pair of sixteen slotted waveguides 218 will individually intercept an incoming wave. The waves will be intercepted by the phased array elements 218. The top portion of FIG. 15 is a schematic of a Ku band receive array. Similar architectures can be utilized for other frequency bands, such as L-band, S-band, and Ka band. Obviously, the present invention may be utilized for each of these frequency bands. As schematically represented by reference numerals 234, 236, the waves received at the waveguide elements 218 are processed by circuitry associated with each of the elements. The incoming wave is then amplified by a respective linear amplifier 238 before being passed to a conventional band pass filter 240 where the signal is filtered. After the signal has been filtered, it is then coded at a code generator 242 before being transferred to a multiplexer 244. The multiplexed signal is passed to an amplifier 246 before being multiplexed and then converted to a digital stream 248 by an analog-to-digital converter 250.

The code division multiplex technique illustrated in the top portion of FIG. 15, reduces the number of components in the down conversion chain as well as the number of analog-to-digital converters. The received signals from the waveguide elements 218 are multiplexed at the multiplexer 244 into a single microwave stream by known CDMA techniques, such as disclosed in U.S. Pat. No. 5,077,562 which is incorporated by reference herein. The multiplexing of the multiple signals reduces the number of components necessary to process the signals and consequently reduces the cost of the ground terminals. When operated in a noise dominant (via injection of orthogonal noise before analog to digital conversion), the receiver dynamic range can also be significantly enhanced through the oversampling of the analog to digital converter.

Incorporating these multiplexing techniques, as shown in FIG. 15, with known digital beam forming techniques provides improved receive performance in high dynamic range operation environments. It should be understood that conventional analog beam forming may be performed on the signals in accordance with the present invention. However, reducing the number of linear amplifiers 238 and phase shifter electronic sets from 360 elements to 16 elements for a receive antenna is a significant advantage and cost reduction provided by the present invention. The utilization of known digital beam-forming in accordance with the present invention provides further component and cost reductions.

The entire receiving antenna processing is performed through the combination of low profile one-dimension radiation elements 214, which are placed in parallel on the circular rotating plate 216. The processing is further accompanied by aligning the long radiating elements 214 along the intended incoming waveform by rotating the circular plate 216 and then performing beam forming in the orthogonal direction by summing up the output signals of the long radiation elements. By processing the signals in this manner, a high performance antenna can be provided with a very low profile circular volume.

Figure 16:
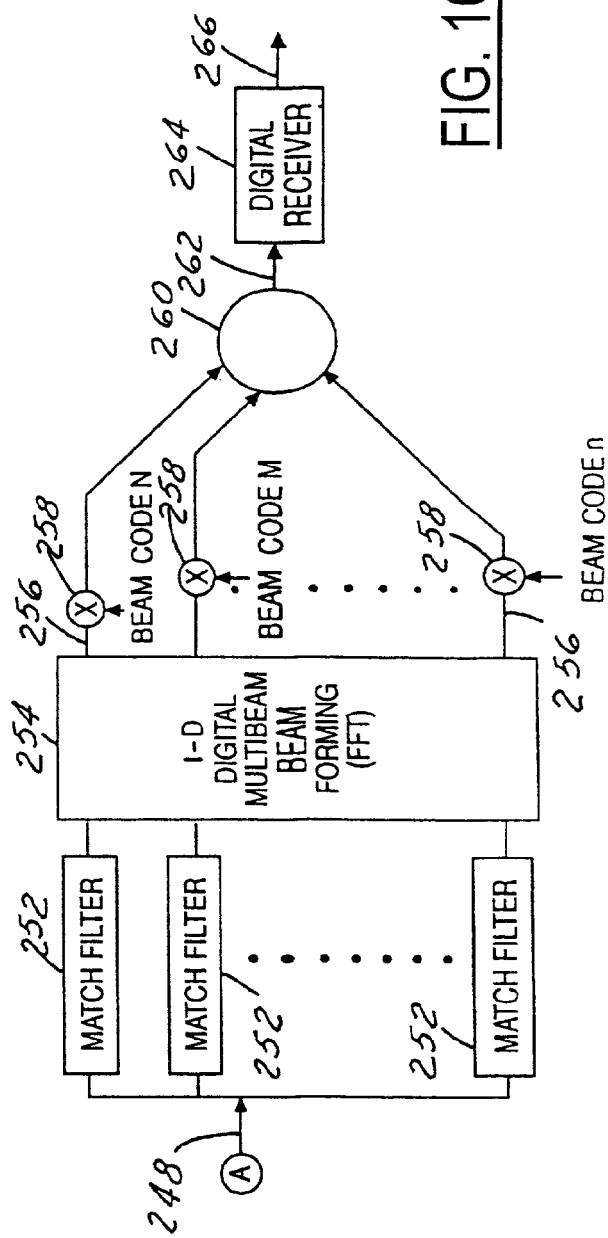
FIG. 16 is a schematic diagram of an integrated retrodirective tracking mechanism.

FIG. 16 illustrates a retrodirective mechanism that is integrated into the low profile antenna 210, described above, to eliminate the cost of conventional tracking mechanisms, in accordance with another preferred embodiment of the present invention. As shown in FIG. 16, the output of the analog-to-digital converter 248 is then input into a plurality of match filters 252, whose outputs are transferred to a digital multibeam beamforming device 254. The digital beams 256 are then transferred to a respective code generator 258 before being multiplexed at a multiplexer 260. The multiplexed beam 262 is then transferred to a digital receiver 264 where the received waveforms are converted into information signals 266.

Similar to the antenna disclosed in the prior figures, the entire receiving antenna and tracking processing of this preferred embodiment is through the low profile, one-dimensional radiation elements 214. The radiation elements 214 are again preferably placed in parallel on the circular plate 216 which rotates about its center axis. The long radiation elements 216 are also aligned along the intended incoming waveform by the rotating circular plate 216 and then subjected to multiple beamforming through fast Fourier transforms (FFT) at the digital multibeam beamforming device 254. The outputs of the digital multibeam beamforming device 254 through FFT are associated with signals from various directions covered by the different (contiguous) beams. The outputs of the FFT will be fed into a retrodirective processing mechanism, as described below, to determine where the intended signal is coming from and then to send the transmit signal to the same direction. The low cost tracking is accomplished by retrodirectivity. The history of the beam positioning will be stored in the terminal as a reference for the satellite ephamerie.

The received signals are again multiplexed into a single microwave stream via known CDMA techniques to reduce the component counts and the ultimate cost of the ground terminals. Incorporating the unique multiple digital beam forming technique with multiplexing provides contiguous multiple receive beams. The receiver monitors the signals from all the multiple beams simultaneously. The outputs of the digital multiple beamformer are then indexed through a set of orthogonal codes, such as hadema code, each of which represents the unique beam direction. By identifying the code of the signals locked onto the receiver, the location where the signal is coming from has been identified as well as the corresponding phase slope of the received aperture.

The transmit signal will be directed to the same antenna beam position from where the received signal originated. The transmit beam can then be steered by a phase conjunction mechanism. This multibeam beamforming and phase conjugation mechanism using a Bulter matrix is described in U.S. Pat. No. 4,812,788. However, the present mechanism is incorporated in digital form through FFT and is therefore uniquely different from a Bulter matrix. The transmit beam utilizes the phasing information, to perform a phase conjugation across the array element, and digitally multiply the outgoing signals with the conjugated phasing (equivalently perform a DFT to the signals on the array aperture). All the retrodirective functions can be accomplished in a very low power and low cost consumer digital electronics.

During an acquisition phase (from a cold start), all the received beams will be on to cover the entire field of view of the fan beam (almost all the elevation at a given azimuth angle). The mechanical search volume will be reduced to a one-dimensional (azimuthal) direction. With some knowledge of where the new satellite may come into the field of view, one may decide to only turn on the receive beams through the incoming direction.

Once the satellite link is established, the tracking mechanism is similar to that of a step scan principle. The signal strengths from adjacent received beams will be monitored and used to compare with the one coming from the main beam, the beam with the strongest signal will be identified as the locked (main) beam. As a satellite moves through from horizon to horizon, a user terminal within the field of view (FOV) will switch the antenna to receive, and transmit beams from one position to another accordingly without conventional antenna tracking loops.

As for equatorial non-geosynchronous constellations, users can use the disclosed terminal to avoid interruption during handover. During transition, there will be one satellite coming in and another satellite going out from a user's FOV. Furthermore, there is only a limited time window when the satellites are at the same elevation or near the same elevation, but at a different azimuth angle. The disclosed antenna can form two beams pointed towards these two satellites simultaneously. Consequently, it can provide the capability of "connect before break" during the hand over phase.

This low profile antenna configuration with a low profile radome may look like a thick pizza and can be mounted on top of a moving vehicle, such as an automobile or an aircraft. This configuration can also be used as fixed user or mobile terminals for low earth orbit satellite constellations at L, S, Ku, and Ka frequency bands.

In operation, the present invention is particularly suitable for broadcasting television signals and receiving the television signals in a multiple link antenna such as that shown in FIGS. 2, 4, 5, and 13. When broadcasting television signals the user terminal may be a receive only terminal or if some feedback is required such as ordering a pay-per-view program, two-way signals may be used.

In the system, the digital television signals are divided into packets or datagrams and routed to user terminals. One envisioned embodiment divides a typical movie into 30 to 100 packets or datagrams lasting from between 1 and 3 minutes. These datagrams will be compressed, coded and modulated independently.

The user terminal establishes a plurality of multiple dynamic links through the communication infrastructure. As mentioned above, the communication infrastructure may comprise various devices including satellites, stratospheric platforms or cellular-type towers. The user receives the data packets from the infrastructure through the multiple dynamic links and reassembles the television signal from the data packets. In this manner, the routing table is used to control the reassembly of the packets so that they are placed in order for coherent viewing.

The circuitry involved in television reception may include a circuit such as that shown in FIG. 6.

In what preferred application of the invention, national feed 32B of FIG. 1 and local feed 32A are transmitted to different portions of the communication infrastructure. For example, national feed 32B may be directed through high altitude communication devices such as GEO, LEO or MEO satellites while the local channel television signal is directed to a stratospheric platform or cellular tower. The user terminal upon selection through a selection device such as a tuner will select the desired signal and display the appropriate television signal on the user terminal.

Figure 17:
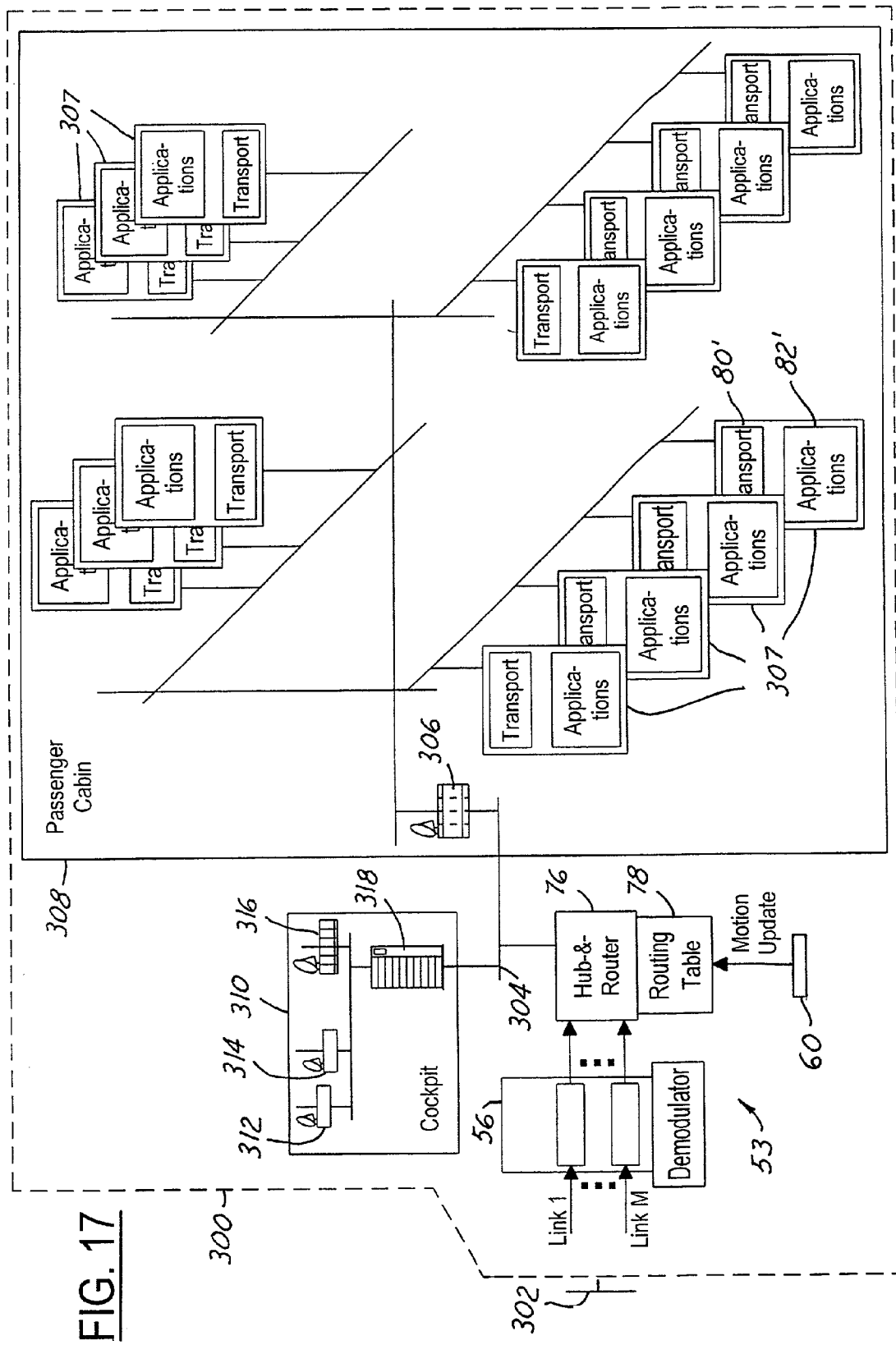
FIG. 17 is a block diagrammatic view of an airplane having a multiple link communication system according to the present invention.

Referring now to FIG. 17, the present invention is also suitable for use in delivering television signals to an aircraft 300. A receiving circuit or processing circuit similar to that shown in FIG. 6 is illustrated with the same reference numerals illustrating the same components. Aircraft 300 has an antenna 302 such as one of the antennas described above. The antenna 302 is formed of a plurality of elements in a similar manner to that described above and may be routed through an analog-to-digital converter and digital beam forming network such as that shown in FIG. 6. A demodulator 56 receives the plurality of links 56 from the previous circuitry and hub and router circuit 78, along with routing table 78 which receives motion data from motion circuit 60, couples the signals to a local area network 304. The local area network server 304 is routed through a server 306 for delivery to the various passenger seat sites or user locations 307. Each passenger seat location 307 includes transport 80' and applications 82'. Various applications or television selections may be communicated through transport 80' as indicated by applications 82'. Users at the individual seating locations 307 may be capable of selecting various viewing selections or surfing the Internet through applications 82'. As illustrated, fourteen different application and transport positions are illustrated in passenger cabin 308. However, each seat in the passenger cabin may include such a system.

Airplane 300 has a cockpit 310 that may include various other servers including an air traffic service server 312, an aeronautical operation control server 314, and an aeronautical administrative communications server 316. A router 318 may couple the servers to network 304.

Such a system may allow a passenger to connect a portable PC through the local area network 304 and establish multiple dynamic links with multiple satellites of the communication infrastructure. Keyboards and screen displays may also be provided at user locations 307. The communication infrastructure preferably comprises a plurality of satellite constellations such as those described above. The multiple links may include multiple speed links having various throughput speeds.

The multiple datagrams may be coupled to a satellite or plurality of satellites of the communication infrastructure described above. The infrastructure communicates the datagrams to the gateway station where they are reassembled. Of course, the datagrams may be both transmitted and received using the TCP/IP protocol described above.

While the best modes for carrying out the invention have been described in detail, those familiar with the art to which this invention relates will recognize various alternative designs and embodiments for practicing the invention as defined by the following claims.

What is claimed is:

1. A communication system comprising:
  a communication infrastructure including at least two devices from a group including a cell tower, a first satellite constellation, a second satellite constellation and a stratospheric platform;
  a user terminal establishing a plurality of multiple dynamic links corresponding respectively to each of said at least two devices from the group, said user terminal generating multiple communication portions of a communication signal and transmitting the multiple communication portions through said dynamic links through said at least two devices from said group; and a gateway terminal receiving the communication portions from said at least two devices from said group and reassembling the communication portions into the communication signal.

2. A system us recited in claim 1, wherein said first satellite constellation and said second satellite constellation are selected from a group consisting of a LEO satellite, a MEO satellite, or a GEO satellite.

3. A system as recited in claim 1, wherein said communication infrastructure comprises a first satellite from said first constellation and a second satellite from said second constellation.

4. A system as recited in claim 1, wherein said user terminal is mobile.

5. A system as recited in claim 1, wherein said multiple dynamic links have independently varying data rates.

6. A system as recited in claim 1, wherein said user terminal comprises a router for routing uplink communication portions through said links.

7. A system as recited in claim 6, wherein said router receives the communication portions and arranges the communication portions in a predetermined sequence.

8. A system as recited in claim 1, wherein said user terminal comprises a multiple beam antenna capable of simultaneously generating the multiple dynamic links.

9. A system as recited in claim 1, wherein said user terminal establishes a plurality of forward links and a plurality of return links, wherein said plurality of forward user links is greater than said plurality of return links.

10. system as recited in claim 1, wherein said user terminal comprises a hub and router circuit coupled to a digital beam former for receiving multiple dynamic links through said at lease two devices.

11. system as recited in claim 1, wherein said user terminal comprises a TCP/IP protocol for transmitting the multiple communication portions.

12. A user terminal for a communication system having a communication infrastructure including at least two devices from a group including a cell tower, a first satellite constellation, a second satellite constellation, and a stratospheric platform, said user terminal comprising:

a plurality of receiving elements;

a receiving beam forming network for forming a plurality of receive beams from the plurality of receiving elements;

a receiving hub and router circuit coupled to the receiving digital beam forming network for assembling communication portions from the beams formed in the receiving beam forming network from the said at least two devices from the group; and a receiving direction control circuit coupled to the hub and router circuit and the receiving digital beam forming circuit for estimating relative position vectors for said at least two devices and the user terminal.

13. A user terminal as recited in claim 12, further comprising:

a plurality of transmitting elements coupled to a transmitting digital beam forming network;

a transmitting hub and router circuit coupled to the transmitting digital beam forming network for making a communication into a plurality of datagrams and routing the plurality of datagrams through multiple dynamic links formed by transmitting digital beam forming network to said at least two devices from the group; and a transmitting direction control circuit coupled to said hub and muter circuit and to said transmitting digital beam forming network for forming relative position vectors of said user terminal and high altitude device, said transmitting digital beam forming network directing transmitting beams at said at least two devices from the group.

14. A user terminal as recited in claim 13, wherein said transmitting direction control circuit comprises estimation algorithms for generating a user state vector and a platform state vector.

15. A user terminal as recited in claim 14, wherein said user state vector and said platform state vector are used to generate relative position vectors.

16. A user terminal as recited in claim 13, wherein said transmitting hub and router circuit comprises a routing table which is updated with motion vectors from said transmitting direction control circuit.

17. A user terminal as recited in claim 13, wherein said transmitting digital beam forming circuit comprises a demodulator.

18. A method of operating a communications system comprising:

forming a plurality of dynamic communication links directed to a communication infrastructure including at least two devices from the group including a cell tower a first satellite constellation, a second satellite constellation and a stratospheric platform;

dividing a communication into a plurality of datagrams;

routing the plurality of datagrams through the at least two devices using the plurality of dynamic communication links;

directing the datagrams from the said at least two devices to a gateway station; and reassembling the datagrams into the communication.

19. A method as recited in claim 18, timber comprising the step of generating a second plurality of datagrams at a gateway station;

establishing a second plurality of dynamic communication links between a communication station and a user terminal through said at least two devices from the group; and reassembling the second plurality of datagrams into the communication at a user terminal.

20. A user terminal for a communication system having a communication infrastructure including at least two devices from a group including a cell tower, a first satellite constellation, a second satellite constellation, and a stratospheric platform comprising:

a plurality of reconfigurable elements;

a beam forming circuit coupled to the plurality of reconfigurable elements; and a hub and muter circuit coupled to the beam forming network for controlling the generation of and direction of a plurality of simultaneous dynamic links for communication with said at least two devices from the group.

* * * * *